US007660297B2

(12) United States Patent
Fisher et al.

(10) Patent No.: US 7,660,297 B2
(45) Date of Patent: Feb. 9, 2010

(54) VOICE OVER IP FORWARDING

(75) Inventors: Oren Fisher, Tel-Aviv (IL); Yariv Lenchner, Petach Tikva (IL); Eran Halbraich, Bet Zayit (IL); Leon Portman, Rishon Lezion (IL); Dan Hadari, Hod Hasharon (IL); Linat Polak, Ranana (IL); Ophir Levy, Givataim (IL)

(73) Assignee: Nice Systems Ltd., Raanana (IL)

(*) Notice: Subject to any disclaimer, the term of this patent is extended or adjusted under 35 U.S.C. 154(b) by 311 days.

(21) Appl. No.: 11/503,117

(22) Filed: Aug. 14, 2006

(65) Prior Publication Data

US 2007/0019634 A1 Jan. 25, 2007

(51) Int. Cl.
*H04L 12/66* (2006.01)

(52) U.S. Cl. ........................ 370/352; 370/217; 709/225

(58) Field of Classification Search ................ 709/204, 709/218, 225–228, 223; 370/252, 352, 390, 370/329, 228, 349
See application file for complete search history.

(56) References Cited

U.S. PATENT DOCUMENTS

| | | | |
|---|---|---|---|
| 5,099,510 A | 3/1992 | Blinken et al. | |
| 5,101,402 A | 3/1992 | Chiu et al. | |
| 5,515,376 A | 5/1996 | Murthy et al. | |
| 5,559,875 A | 9/1996 | Bieselin et al. | |
| 5,710,591 A | 1/1998 | Bruno et al. | |
| 5,764,901 A | 6/1998 | Skarbo et al. | |
| 5,787,253 A | 7/1998 | McCreery et al. | |
| 5,841,977 A | 11/1998 | Ishizaki et al. | |
| 5,867,559 A | 2/1999 | Jorgensen et al. | |
| 5,893,053 A | 4/1999 | Trueblood | |
| 5,963,913 A | 10/1999 | Henneuse et al. | |
| 5,978,835 A | 11/1999 | Ludwig et al. | |
| 6,006,253 A | 12/1999 | Kumar et al. | |
| 6,091,709 A * | 7/2000 | Harrison et al. | 370/235 |

(Continued)

FOREIGN PATENT DOCUMENTS

| | | |
|---|---|---|
| EP | 0 841 832 | 5/1998 |
| EP | 0902569 | 3/1999 |
| EP | 1512263 | 9/2003 |
| WO | WO 99-46702 | 9/1999 |
| WO | WO 01/60027 | 8/2001 |

(Continued)

OTHER PUBLICATIONS

International Search Report for International Application No. PCT/IL07/00991 Date of Mailing Jul. 7, 2008.

(Continued)

*Primary Examiner*—Thong H Vu
(74) *Attorney, Agent, or Firm*—Pearl Cohen Zedek Latzer, LLP

(57) ABSTRACT

A system for forwarding packed-based media in a network, the system comprising: a) at least one forwarder, configured to extract at least one packet of media from at least one media source accessible to the forwarder, and to forward the extracted packet of media to at least one capture device, and b) a forwarding manager, communicating with the forwarder, using a predefined protocol, the communicating comprising receiving media accessibility information relating to the forwarder and the at least one media source accessible to the forwarder and receiving a request identifying a media source, and configured to list at least one of the forwarders, wherein the listed forwarders are usable for forwarding the at least one packet of media from the identified media source according to the media accessibility information.

37 Claims, 14 Drawing Sheets

U.S. PATENT DOCUMENTS

| | | | | |
|---|---|---|---|---|
| 6,108,782 | A | 8/2000 | Fletcher et al. | |
| 6,122,665 | A | 9/2000 | Bar Eitan et al. | |
| 6,167,449 | A * | 12/2000 | Arnold et al. | 709/227 |
| 6,181,784 | B1 | 1/2001 | Duran et al. | |
| 6,311,231 | B1 | 10/2001 | Bateman et al. | |
| 6,335,926 | B1 * | 1/2002 | Silton et al. | 370/351 |
| 6,373,817 | B1 * | 4/2002 | Kung et al. | 370/217 |
| 6,397,072 | B1 * | 5/2002 | Peters et al. | 455/456.3 |
| 6,480,584 | B2 | 11/2002 | Duran et al. | |
| 6,490,344 | B1 | 12/2002 | Murai et al. | |
| 6,496,477 | B1 * | 12/2002 | Perkins et al. | 370/228 |
| 6,535,909 | B1 | 3/2003 | Rust | |
| 6,542,602 | B1 | 4/2003 | Elazar | |
| 6,661,879 | B1 | 12/2003 | Schwarts et al. | |
| 6,687,747 | B1 * | 2/2004 | Huang et al. | 709/223 |
| 6,717,913 | B1 * | 4/2004 | Ghahremani et al. | 370/230 |
| 6,781,963 | B2 * | 8/2004 | Crockett et al. | 370/260 |
| 6,839,323 | B1 | 1/2005 | Foti | |
| 6,865,681 | B2 * | 3/2005 | Nuutinen | 726/14 |
| 6,876,633 | B2 | 4/2005 | Strathmeyer et al. | |
| 6,910,074 | B1 * | 6/2005 | Amin et al. | 709/227 |
| 6,944,150 | B1 * | 9/2005 | McConnell et al. | 370/352 |
| 6,954,454 | B1 * | 10/2005 | Schuster et al. | 370/352 |
| 6,954,524 | B2 * | 10/2005 | Gibson | 379/211.02 |
| 6,985,440 | B1 | 1/2006 | Albert et al. | |
| 7,002,936 | B2 * | 2/2006 | Agrawal et al. | 370/329 |
| 7,058,714 | B2 * | 6/2006 | Michielsens et al. | 709/225 |
| 7,010,106 | B2 | 7/2006 | Gritzer et al. | |
| 7,072,308 | B2 * | 7/2006 | Strathmeyer et al. | 370/259 |
| 7,107,312 | B2 * | 9/2006 | Hackbarth et al. | 709/204 |
| 7,269,162 | B1 * | 9/2007 | Turner | 370/352 |
| 7,289,669 | B2 * | 10/2007 | Yasuho et al. | 382/232 |
| 7,305,082 | B2 | 12/2007 | Elazar et al. | |
| 7,339,929 | B2 * | 3/2008 | Zelig et al. | 370/390 |
| 2002/0006187 | A1 | 1/2002 | Lukas | |
| 2002/0027977 | A1 | 3/2002 | Noguchi | |
| 2002/0032751 | A1* | 3/2002 | Bharadwaj | 709/218 |
| 2002/0165969 | A1* | 11/2002 | Gallant | 709/227 |
| 2002/0196741 | A1* | 12/2002 | Jaramillo et al. | 370/252 |
| 2003/0107991 | A1 | 6/2003 | Tezuka et al. | |
| 2003/0142805 | A1 | 7/2003 | Gritzer et al. | |
| 2004/0015574 | A1* | 1/2004 | Meyerson | 709/220 |
| 2004/0141594 | A1 | 7/2004 | Brunson et al. | |
| 2004/0165709 | A1 | 8/2004 | Pence et al. | |
| 2005/0094651 | A1 | 5/2005 | Lutz et al. | |
| 2005/0141691 | A1 | 6/2005 | Wengrovitz | |
| 2005/0232222 | A1* | 10/2005 | McConnell et al. | 370/349 |
| 2006/0029062 | A1 | 2/2006 | Rao et al. | |
| 2006/0107310 | A1 | 5/2006 | Schmid et al. | |
| 2006/0268847 | A1 | 11/2006 | Knoll et al. | |
| 2008/0170680 | A1* | 7/2008 | Gibson | 379/211.02 |

FOREIGN PATENT DOCUMENTS

| | | | |
|---|---|---|---|
| WO | WO 01/86924 | | 11/2001 |
| WO | WO 01/91374 | | 11/2001 |
| WO | WO 02/17036 | | 2/2002 |
| WO | WO 02/19620 | A2 | 3/2002 |
| WO | WO 03/107622 | | 12/2003 |
| WO | WO 2004057846 | | 7/2004 |
| WO | WO 2004066604 | | 8/2004 |
| WO | WO 2004107721 | | 12/2004 |
| WO | WO 2005048531 | | 5/2005 |
| WO | WO 2005050463 | | 6/2005 |
| WO | WO 2005050952 | | 6/2005 |

OTHER PUBLICATIONS

"Check Point Fire Wall-1: Extensible Stateful Inspection" Check Point Software Technologies, www.checkpoint.com/products/technology/page3.html, 3 P., 1998.

"Vic-Video Conference" http://www.archive.org/web/19980209092521/mash.cs.berkeley.edu/mash.... 1998.

Beckman "Netmeter 1.0: See and Hear Your Network" Mac Publishing, L.L.C., p. 72, 1996.

McCanne et al. Vat-LBNL Audio Conferencing Tool http://www.archive.org/web/19980126183021/www-nrg.ee.Ibl.gov/vat/, 5 p. 1998.

"Player (Player): Syntax", http://www.archive.org/web/19980209092521/mash/cs.berkely.edu/mash..., 3 P., 1998.

Intel Corporation "Intel Internet Video Phone Trail Applet 2.1: The Problem and Pitfalls of Getting H.323 Safety Through Firewalls" http://support.intel.com/support/videophone/trail21/h323_wpr.htm#a18, 32 P. 1997.

Pelletier et al. "Netmeeting Through A Packet-Fitter", Topic in comp.security.firewalls, 4 P., 1998.

Eldrige et al. "MS NetMeeting 2.0 and Raptor Eagle Vers. 4.0" Topic in muc.lists.firewalls, 3 P., 1997.

"Communications Solutions: Vendor to Vendor" CTI News, http://www.tncnet.com/articles/ctimage/0699/0699news.htm, 15 P., 1999.

"Breakthrough Internetworking Application for Latency & Loss Measurement From RADCOM" http://www.radcom.com/radcom/about/pr020999.htm, 2 P., 1997.

"New VoIP Testing Application From RADCOM" http://www.radcom.com/radcom/about/pr020999.htm, RADCOM Press Releases, 2 P., 1999.

"Protocols, Protocols, Protocols . . . ", http://www.radcom-inc.com/protpcol.htm, Supported Protocols RADCOM , 10 P., 1998.

"RADCOM Adds UNI 4.0 Signalling and MPEG-II Support to ATM Analysis Solutions", http://www.radcom-inc.com/press13.htm, 1 P., 1996.

Willis "Voice Over I, The Way It Should Be" WAN System & Telephony, http://www.nwc.com/1001/1001ws12.html, 5 P., 1999.

"Hear It for Yourself: Audio Samples From Our H.323 Tests" WAN System & Telephony, http://www.nwc.com/1001/1001ws12.html, 7 P. 1999.

"Prism200 Multiport WAN/LAN/ATM Analyzer" RADCOM, http://www.radcom-inc.com/pro-pl.htm, 3 P., 1998.

AG Group "EtherPeek for Windows. Version 2.0 User's Guide" Eternet Network Analysis Software, User Manual, AG Group, Inc., 169 P., 1989-1997.

Kohlhepp "AG Group Skyline/Satelite Combination Offers Bird's-Eye View of Network Traffic", http://ibg.networkcomputing.com/612/612skyline.html, 7 P., 1995.

"Microsoft RIFF", http://netghost.narod.ru/gff/graphics/summary/micriff.htm, 5 P., 1996.

"Supported Applications" Check point Software Technologied Ltd., http://www.checkpoint.com/products/technology/index.html, 6 P. 1998.

Waldbusser "RFC 1757—Remote Network Monitoring Management Information Base", http://www.faqs.org/rfcs/rfc1757.html, 65 P., 1995.

"PrismLite: Portable WAN/LAN/ATM Protocol Analyzer", http://www.radcom-inc.com/pro-p2.htm, 3 P., 1998.

Simpson "Viewing RTPDump Files", http://bmrc.berkeley.edu/-davesimp/viewingNotes.html, 1 P., 1996.

Koyama et al. "Personal Multimedia Communication System", Hitachi Rev., 44(4); 207-212, 1995. p. 211, r-h col., 2-P.212, 1-h col.., 1 Fig 6; Claims: A: 2.

Schulzrinne et al. "RFC 1889: RTP: A Transport Protocol for Real-Time Applications" Network Working Group Request for Comments, p. 1-38, 1996. 02.1-02.3, 05.2, 05.3, Claims: A:127.

"Series H: Audiovisual and Multimedia System. Infrastructure of Audiovisual Services-System and Terminal Equipment for Audiovisual Services. Packet-Based Multimedia Communications Systems" International Telecommunication Union (ITU), ITU-T Recommendation H.323, 562 P., 1998.

Notice of Allowance of U.S. Appl. No. 10/913,326 mailed on Sep. 15, 2008.

International Search Report of Application No. PCT/IL2007/000111 mailed on Sep. 12, 2008.

* cited by examiner

1000

VOICE OVER IP FORWARDING

FIELD AND BACKGROUND

The present invention relates to packed-based media capturing and, more particularly, but not exclusively to a system and methods for VoIP forwarding in a network.

There are many active means of IP recording, based on the concepts of forwarding from a VoIP telephony end-point, as well as other IP forwarding capable devices, such as IP forwarding agents, VoIP recording gateways, forwarding network appliances, etc. As a result, there arises a need to provide a protocol based method, for controlling VoIP forwarding devices in a computer network.

Currently, IP capture systems support two basic methods of recording, namely, passive sniffing recording, and active forwarding.

Passive recording is based on capturing raw IP packets, which are transmitted over the network, identifying them according to information found in the headers of the protocol and transport layers (such as IP and UDP), and dispatching them for recording to the various recording channels according to information found in the respective header. The whole process is conducted without any interfacing with the VoIP system and requires interfacing only with the lower networking layer.

Active recording, on the other hand, is based on forwarding of the requested RTP (real-time transport protocol—the Internet-standard protocol for the transport of real-time data including audio and video) packets (or any other packets of media) to designated sockets in the capture. The forwarding may be conducted either by a designated component in the VoIP system, or by a designated mediating agent. The active recording method enables the recording from VoIP telephony systems, as well as from traditional voice telephony systems, without complex interaction with the networking communication layer.

SUMMARY OF THE INVENTION

According to one aspect of the present invention there is provided a system for forwarding packed-based media in a network.

The system comprises at least one forwarder, configured to extract at least one packet of media from at least one media source accessible to the forwarder, and to forward the extracted packet of media to at least one capture device.

The system further comprises a forwarding manager, communicating with the forwarder, using a predefined protocol, the communicating comprising receiving media accessibility information relating to the forwarder and the at least one media source accessible to the forwarder, receiving a request identifying a the media source, and listing at least one forwarder usable for forwarding the at least one packet of media from the identified media source according to the media accessibility information.

Preferably, the forwarder is further configured to select the packets of media amongst data packets transmitted through the media sourced according to a predefined policy.

Preferably, the forwarding manager is further configured to initiate and terminate the forwarding of the at least one packet of media from the identified media source.

According to a second aspect of the present invention there is provided a forwarder configured to extract at least one packet of media from at least one media source accessible to the forwarder, and to forward the extracted packet of media to at least one capture device. Optionally, the forwarder is further configured to select the packets of media amongst data packets transmitted through the media source according to a predefined policy. Preferably, the predefined protocol complies with Session Initiation Protocol (SIP).

According to a second aspect of the present invention there is provided a method for forwarding packed-based media in a network, comprising: a) receiving media accessibility information relating to at least one forwarder and at least one media source accessible to the forwarder using a predefined protocol; b) receiving a request identifying a media source, using the predefined protocol; and c) providing a list comprising at least one forwarder usable for forwarding at least one packet of media from the identified media source according to the media accessibility information. Preferably, the predefined protocol complies with Session Initiation Protocol (SIP).

In the above aspects of the invention, forwarding is an act in which a media stream is actively passed to a recording system, thus relieving the recording infrastructure of having to intercept the media. Such active passing may be carried out by elements on the communication network which identify the media stream in question and forward the media stream to the recording system which is located elsewhere than on the communication path of the media stream.

Using forwarding-based recording separates between the tasks of media interception and media processing. Media interception is done solely by the forwarding device (forwarder). The task of media processing, organizing and storing (or recording) for further usage, is done by other components of the recording system, herein referred to as capture devices.

The task of forwarding is carried out by elements referred to herein as Forwarding Devices or Forwarders—entities, which have the ability to intercept the media stream, say voice over IP (VoIP) or voice traffic, extract the voice over IP (VoIP) or voice traffic, and then pass the traffic to the relevant capturing device.

The forwarders may include agents located on computers which serve as the media stream source, or software or hardware components on network telephones or may be software or hardware components located at network nodes, for example switchboards. Examples of forwarding devices include, but are not limited to: a VoIP Recording Gateway, an IP forwarding agent, recording enabled IP phones, etc.

The control of the forwarding actions, as well as the general handling of the forwarding device (forwarder) are carried out using a predefined forwarding control protocol, as described in further detail hereinbelow.

A system for voice over IP (VoIP) forwarding in a network, according to a preferred embodiment of the present invention is illustrated in a block diagram, hereby presented as FIG. 1, explained in further detail herein below.

Unless otherwise defined, all technical and scientific terms used herein have the same meaning as commonly understood by one of ordinary skill in the art to which this invention belongs. The materials, methods, and examples provided herein are illustrative only and not intended to be limiting.

Implementation of the method and system of the present invention involves performing or completing certain selected tasks or steps manually, automatically, or a combination thereof.

Moreover, according to actual instrumentation and equipment of preferred embodiments of the method and system of the present invention, several selected steps could be implemented by hardware or by software on any operating system of any firmware or a combination thereof. For example, as hardware, selected steps of the invention could be implemented as a chip or a circuit.

As software, selected steps of the invention could be implemented as a plurality of software instructions being executed by a computer using any suitable operating system. In any case, selected steps of the method and system of the invention could be described as being performed by a data processor, such as a computing platform for executing a plurality of instructions.

BRIEF DESCRIPTION OF THE DRAWINGS

The invention is herein described, by way of example only, with reference to the accompanying drawings. With specific reference now to the drawings in detail, it is stressed that the particulars shown are by way of example and for purposes of illustrative discussion of the preferred embodiments of the present invention only, and are presented in order to provide what is believed to be the most useful and readily understood description of the principles and conceptual aspects of the invention. In this regard, no attempt is made to show structural details of the invention in more detail than is necessary for a fundamental understanding of the invention, the description taken with the drawings making apparent to those skilled in the art how the several forms of the invention may be embodied in practice.

In the drawings.

DESCRIPTION OF THE PREFERRED EMBODIMENTS

In order to establish a common language, which provides better understanding of the protocol information, as well as the architecture of the system, a glossary of relevant terms is provided herein below.

According to preferred embodiments, there are several schemes for active IP recording, which may be used to prepare a forwarding-based recording system. The difference comes from the provider, generating the forwarded streams of media, as well as from the party, with which the recording system interacts to control the forwarding.

Exemplary schemes discussed in the following section include the following: Centralized Forwarding Server: Centralized Controller with Phone Forwarding, Forwarding from the IP Phone, Forwarding by an IP Recording Agent, and Forwarding by a VoIP Recording Gateway.

The invention is herein described, by way of example only, with reference to the accompanying drawings. With specific reference now to the drawings in detail, it is stressed that the particulars shown are by way of example and for purposes of illustrative discussion of the preferred embodiments of the present invention only, and are presented in order to provide what is believed to be the most useful and readily understood description of the principles and conceptual aspects of the invention. In this regard, no attempt is made to show structural details of the invention in more detail than is necessary for a fundamental understanding of the invention, the description taken with the drawings making apparent to those skilled in the art how the several forms of the invention may be embodied in practice.

Figure 1:
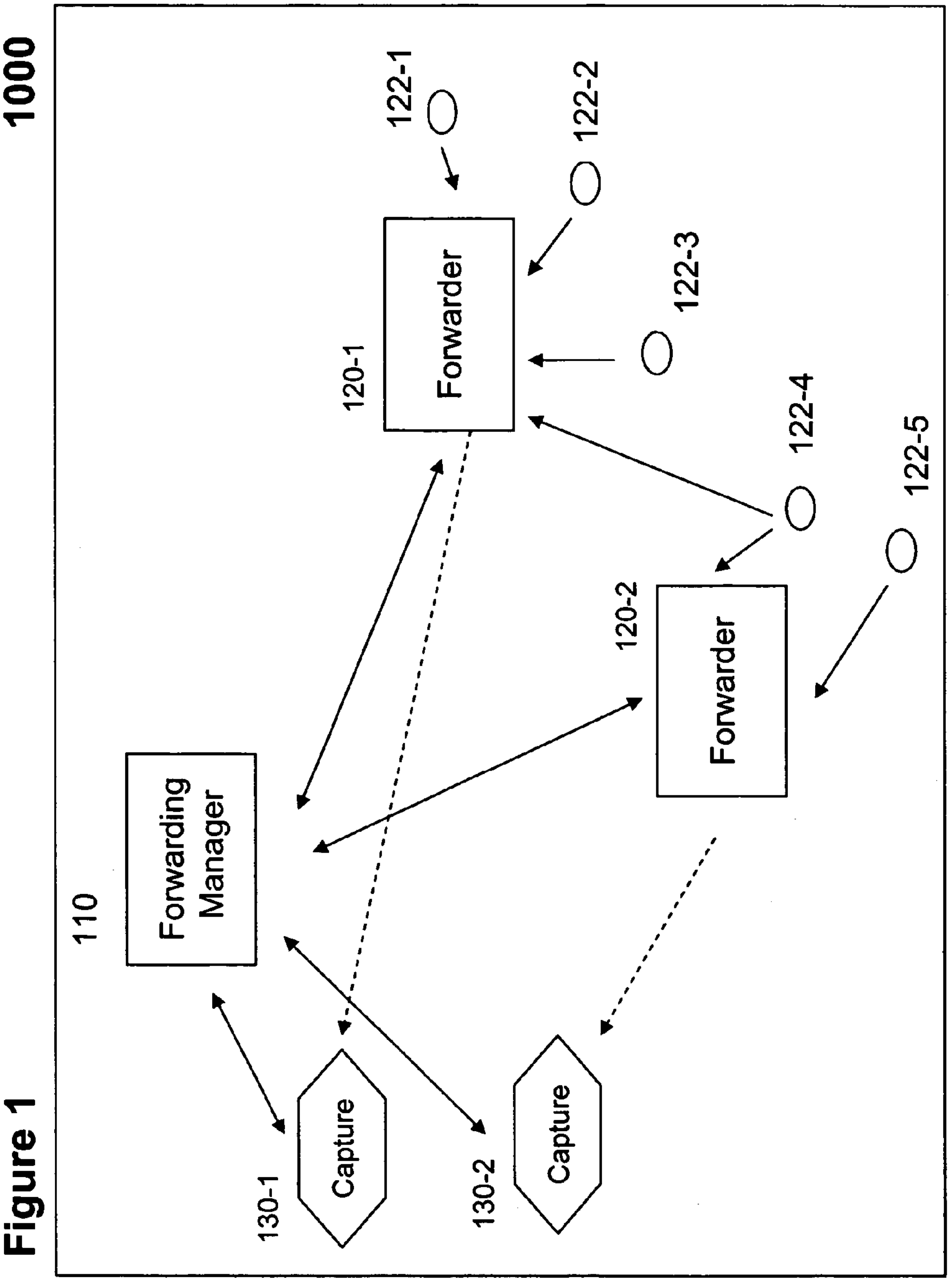
FIG. 1 is a block diagram illustrating a system for voice over IP (VoIP) forwarding in a network, according to a preferred embodiment of the present invention.

Reference is now made to FIG. 1, which is a block diagram illustrating a system for voice over IP (VoIP) forwarding in a network, according to a preferred embodiment of the present invention.

System 1000 comprises: one or more forwarder(s) 120-1 & 120-2, configured to extract Voice over Internet Protocol (VoIP) data packets from one or more media source(s) which are accessible to the forwarders, and to forward the extracted data packets to one or more capture device(s) 130-1 & 130-2.

System 1000 also includes one or more capture device(s) 130-1 & 130-2.

The capture devices(s) are configured to communicate with the forwarder(s) 120-1 & 120-2 for receiving the extracted and forwarded data packets.

The system 1000 also includes a forwarding manager 110. The forwarding manager 110 may be implemented as a device forwarding manager, or as a forwarding location manager, as described in further detail hereinbelow.

The forwarding manager 110 communicates with the forwarder(s) 120-1 & 120-2, and the capture device(s) 130-1 & 130-2, through control components which manage the capture device(s). The forwarding manager 10 is configured to receive and collect information relating to the forwarder(s)

120-1 & 120-2, and the one or more media source(s) 122-1 to 122-5, accessible to the forwarder(s) 120-1 & 120-2, utilizing a predefined protocol.

The forwarding manager 110 also receives a request identifying a media source. Then, the forwarding manager 110 lists one or more forwarder(s) for forwarding VoIP data packet(s) from the identified media source, according to the collected information.

Preferably, the forwarding manager also initiates and terminates the forwarding of the VoIP data packets from the identified media source, by the selected forwarder.

The selection of the forwarder may be carried out by recording infrastructure control components, utilizing a predefined set of rules which are applied on the information regarding the forwarders and the media sources accessible by each forwarder. Optionally, the information about the forwarders is provided by the forwarding manager 110, as described in further detail hereinbelow.

Alternatively, the forwarding manager 110 only lists the forwarders having access to the identified media source, and other components select one of the forwarders for forwarding media carrying data packets from the identified media source.

There are two basic architectures for a system for voice over IP (VoIP) forwarding in a network, according to a preferred embodiment of the present invention. The first is a centralized control schema, and the latter is a distributed control schema.

Figure 2A:
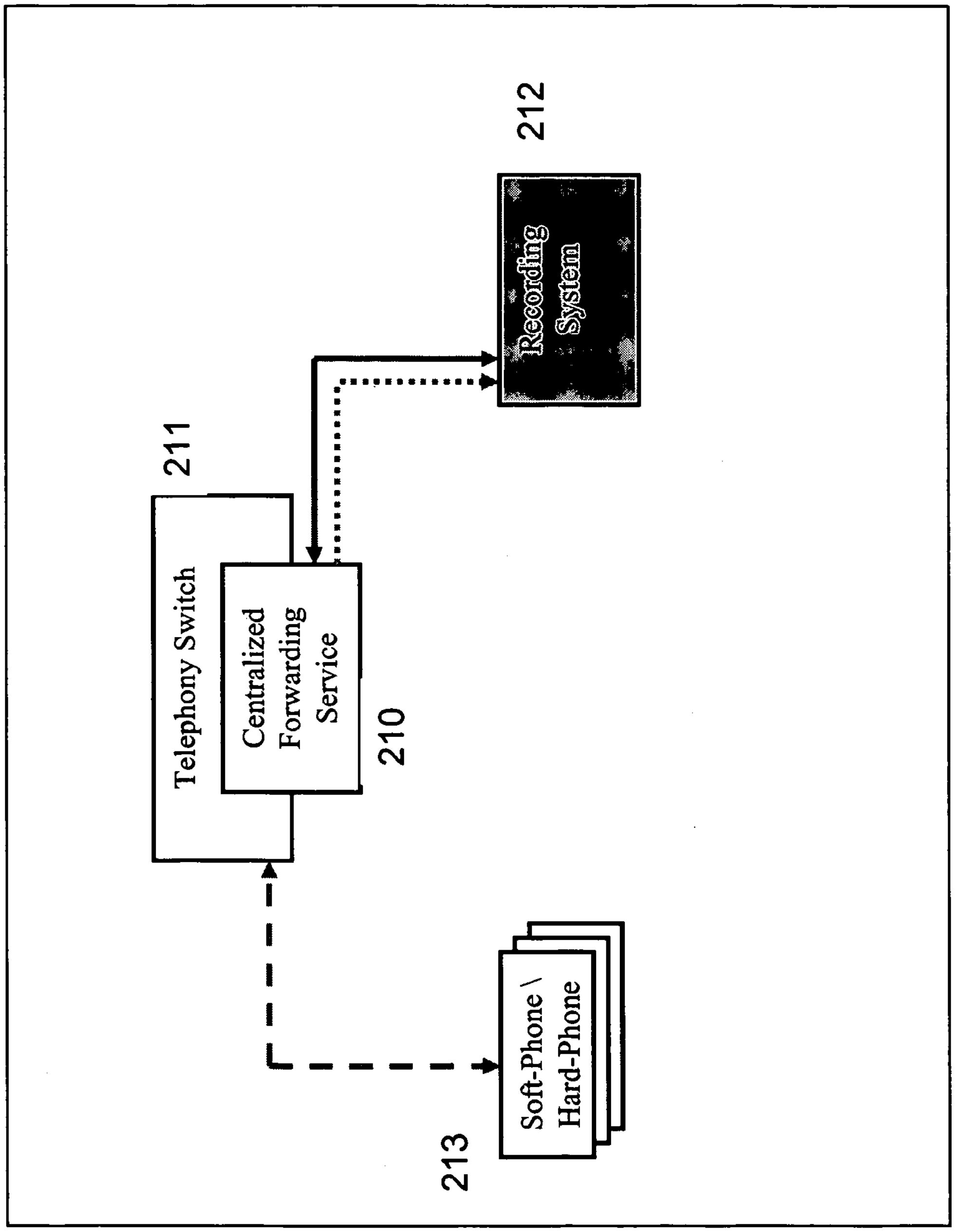
FIG. 2*a* is a block diagram illustrating a forwarding based VoIP recording system having a centralized forwarding server, according to a preferred embodiment of the present invention.

Reference is now made to FIG. 2*a* which is a block diagram illustrating a forwarding based VoIP recording system having a centralized forwarding server, according to a preferred embodiment of the present invention.

Centralized Forwarding Server Scheme

A system according to a preferred embodiment may be used for implementing a schema of active VoIP session recording based on a central forwarding service. The central forwarding service may be provided by a telephony switch 211. The central forwarding service 210 is the point of contact for any forwarding related activity, for forwarding media as well as for control purposes.

The recording system 212 interacts with the central forwarding service 210, for establishment and termination of media forwarding sessions implemented using a centralized forwarding service 210.

Usually, but not exclusively, the establishment and termination utilizes a proprietary linkage used for CTI (computer telephony integration) information. Alternatively, the central forwarding service 210 is accessed directly rather than through the propriety linkage.

The central forwarding service 210 is responsible for extracting and forwarding media streams from a telephony device 213 and for sending the media streams to the requested media target in the recording system 212. The method used by the switch 211 implementing the forwarding service for acquiring access to the media is usually a vendor specific proprietary method, as known in the art.

Figure 2B:
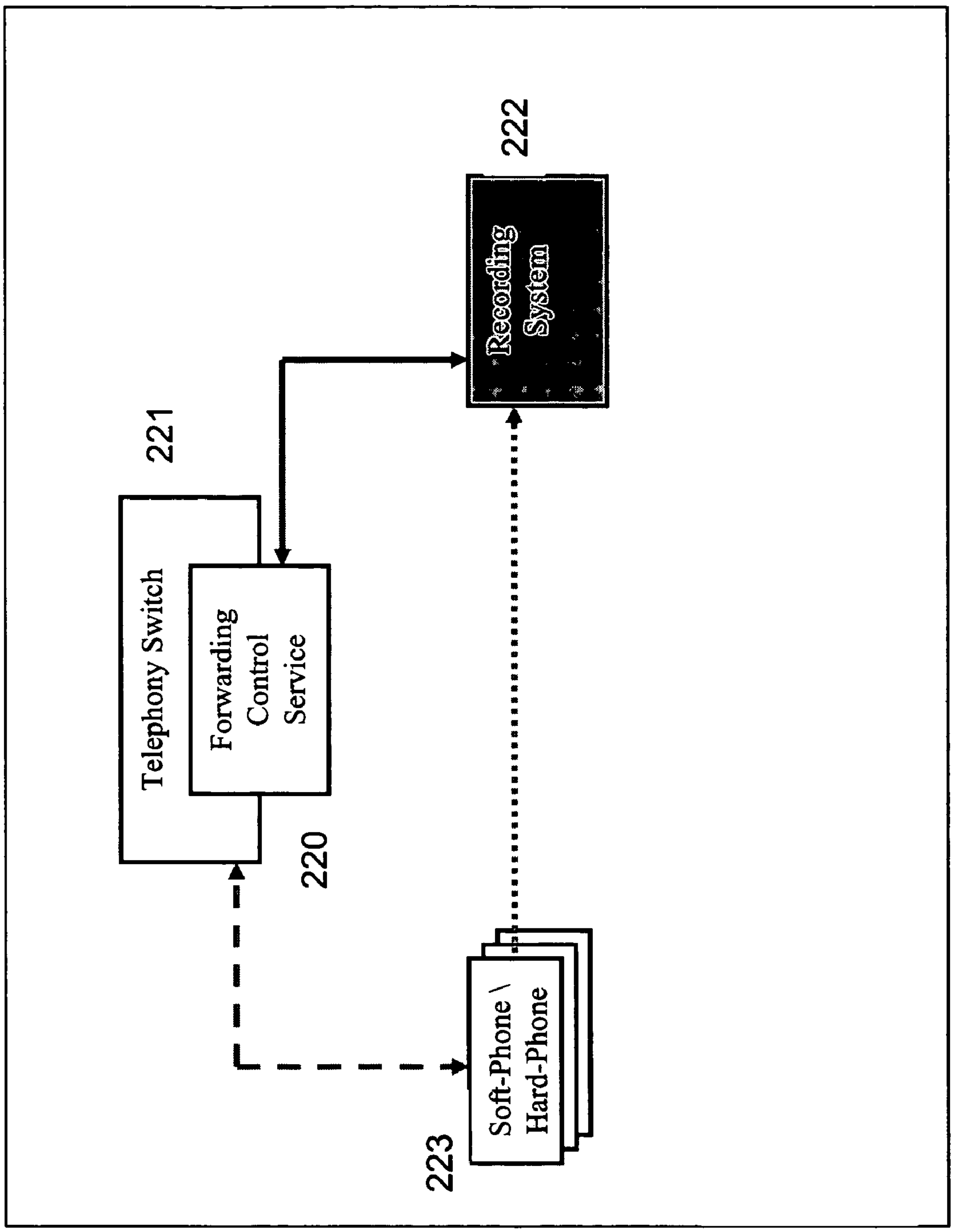
FIG. 2*b* is a block diagram illustrating a forwarding based VoIP recording system having a centralized controller with phone forwarding, according to a preferred embodiment of the present invention.

Reference is now made to FIG. 2*b* which is a block diagram illustrating a forwarding based VoIP recording system having a centralized controller with phone forwarding, according to a preferred embodiment of the present invention.

Centralized Controller With Phone Forwarding

A schema of active IP recording based on a forwarding service may be provided by the telephony switch 221. The central forwarding service 220 is the point of contact for forwarding controlling related activity, while the providing of the media is carried out by the phone itself.

In this type of solution, the recording system 222 interacts with a forwarding control service 220 for establishment and termination of media forwarding sessions. Usually, but not exclusively, the interaction is carried out utilizing a propriety linkage used for computer telephony integration (CTI) information, as described hereinabove.

The media streams are generated in the relevant phone terminals 223, acting both as media sources and media providers, and sent from the phone terminals 223 towards the requested receiving party, and the recording system 222.

The methods by which the centralized controller 220 interacts with the phones 223, instructing them to initiate and terminate the forwarding of media streams to the awaiting recording system 222 may be based on any known in the art technique(s). A number of exemplary schemes follow.

Figure 2C:
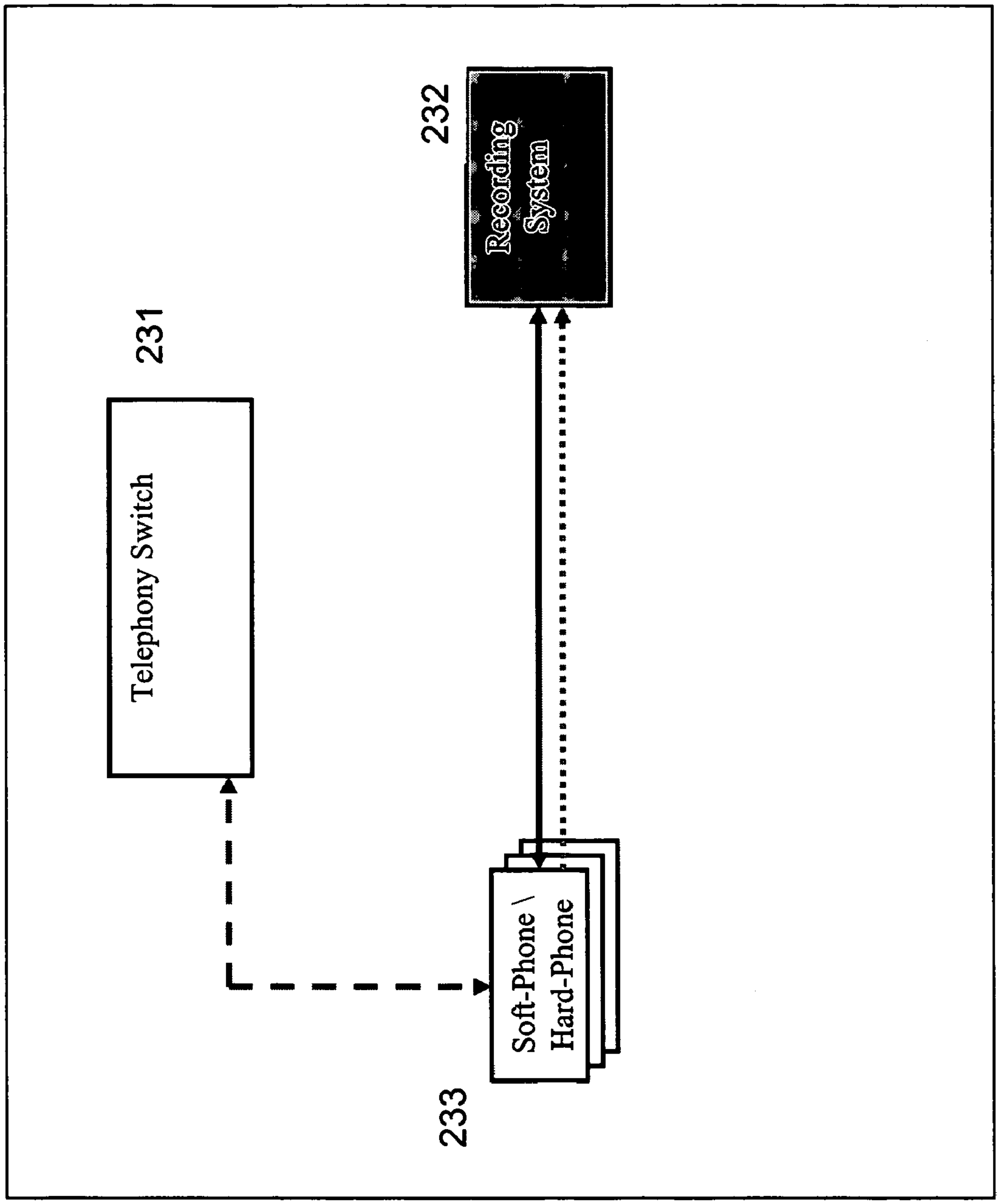
FIG. 2*c* is a block diagram illustrating a forwarding based VoIP recording system implementing direct forwarding from an IP (VoIP) phone, according to a preferred embodiment of the present invention.

Reference is now made to FIG. 2*c* which is a block diagram illustrating a forwarding based VoIP recording system implementing direct forwarding from an IP (VoIP) phone, according to a preferred embodiment of the present invention.

Direct Forwarding From the IP Phone

A schema of active IP recording may be based on direct interactions between the recording system 232 and the IP telephones 233. IP phones may be implemented as soft phones, as known in the art.

The telephony vendor(s) of the IP phones 233 provide the means for supporting the forwarding related activity, in both the control facet and media facet.

In such a solution, the recording system 232 interacts with the IP phone 233, which is the source of the media to record, for establishment and termination of media forwarding sessions. The media streams are generated by the telephone 233 and sent from the telephone towards the recording system 232. In this schema the phones 233 themselves act as forwarders, taking the role of the media provider, as well as the role of the media source.

Figure 2D:
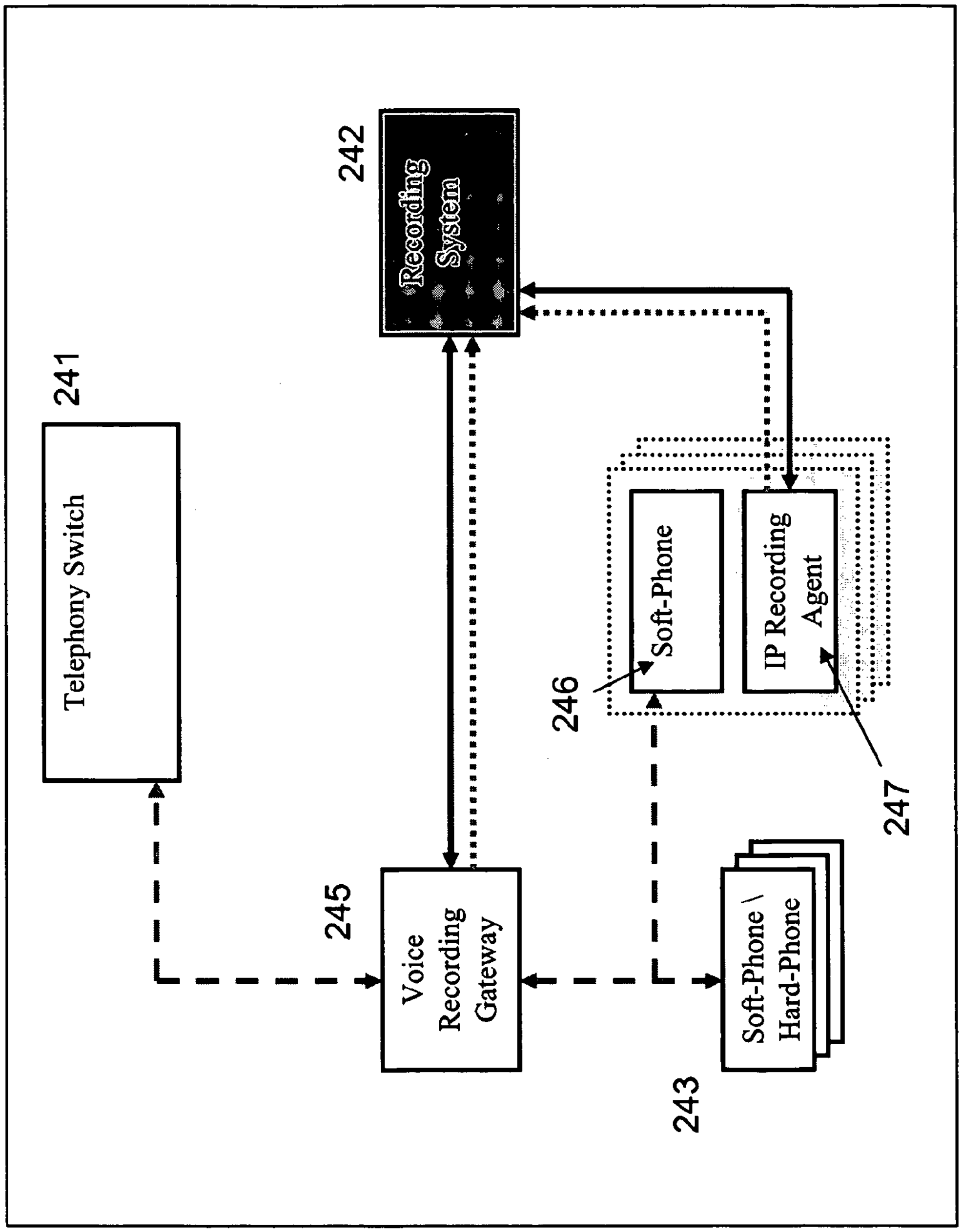
FIG. 2*d* is a block diagram illustrating a forwarding based VoIP recording system implementing indirect forwarding from an IP (VoIP) phone, according to a preferred embodiment of the present invention.

Reference is now made to FIG. 2*d* which is a block diagram illustrating a forwarding based VoIP recording system implementing indirect forwarding from an IP (VoIP) phone (through an IP recording agent), according to a preferred embodiment of the present invention.

Forwarding by a VoIP Recoding Agent

A schema of active IP recording may be based on IP recording agents 247 of the recording system itself, which are hosted on client computer(s) responsible for forwarding the media from soft-phones 246. The soft phones 246 may be hosted on the same computer, together with media from nearby phones.

The recording system 242 interacts with the agents 247 for the establishment and termination of media forwarding sessions. The agents 247 intercept the media streams which are requested to be recorded from the soft phone 246.

The interception of the media streams by an agent 247 is carried out in a passive manner, by sniffing the IP packets of the media streams.

Optionally, the sniffing of the IP packets from the soft phones 246 may be carried out from the network's interface card (NIC).

The NIC has access to the RTP (real-time transport protocol—the Internet-standard protocol for the transport of real-time data including audio and video) packets sent to or from the computer hosting the agent 247. The NIC may also have access to other RTP packets, which are also routed to the NIC, using spanning and monitoring features of the underlying networking infrastructure.

The agent 247 forwards selected data packets towards the requested receiving party in the recording system 242. In this schema the agent 247 acts as a forwarder, taking the role of the media provider, and usually has easy access to the media source.

Forwarding by a VoIP Recording Gateway

A schema of active IP recording may be based on recording gateway 245 implemented on a network appliance. The recording gateway 245 is either part of the recording system itself, or a part of the networking infrastructure.

The recording gateway 245 is responsible for forwarding requested media streams, utilizing its pre-obtained knowledge regarding the topology of the network.

In this type of solution, the recording system 242 interacts with these gateways 245 for the establishment and termination of media forwarding sessions. The gateway 245 intercepts the relevant media streams which are requested to be recorded, and forwards the streams towards the requested receiving party in the recording system 242. In this schema the gateway 245 acts as a forwarder, taking the role of the media provider.

Figure 3A:
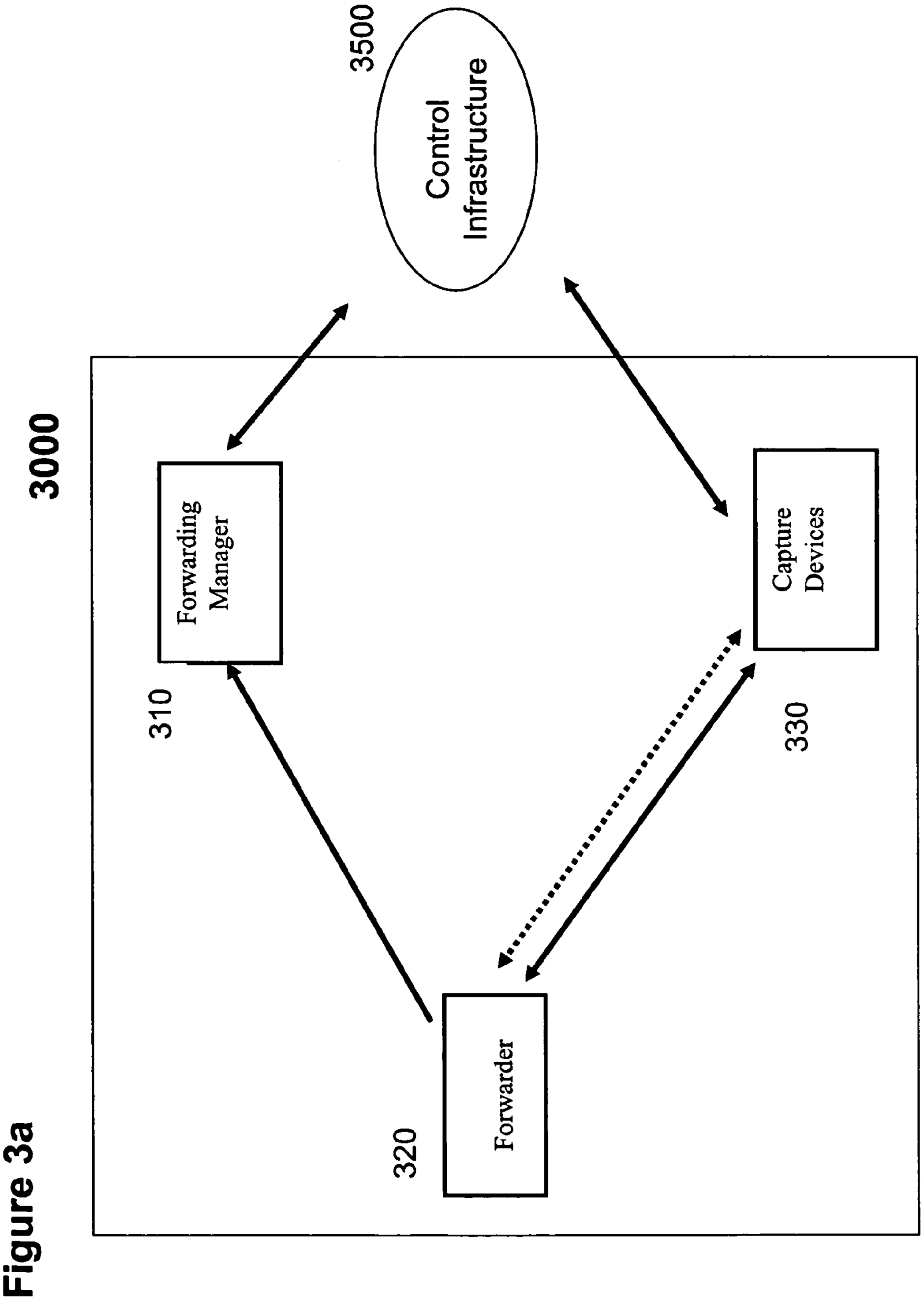
FIG. 3*a* is a block diagram illustrating a system for voice over IP (VoIP) forwarding in a network having a distributed architecture, according to a preferred embodiment of the present invention.

Reference is now made to FIG. 3*a* which is a block diagram illustrating a system for voice over IP (VoIP) forwarding in a network having a distributed architecture, according to a preferred embodiment of the present invention.

System 3000 includes one or more forwarders 320, which are capable of intercepting the media and forwarding the media to various targets once requested.

The distributed architecture includes a forwarding manager 310. The forwarding manager 310 maintains an updated picture of available forwarders 320, as well as the media sources which are accessible by each of the forwarders 320. All the basic entities interact with each other using the forwarding control protocol, described in further detail herein below.

The forwarders 320 functionality includes, as mentioned earlier, the interception of the media traffic and the forwarding of selected VoIP data packets to relevant capture devices 330, according to a dynamic set of rules.

Figure 3B:
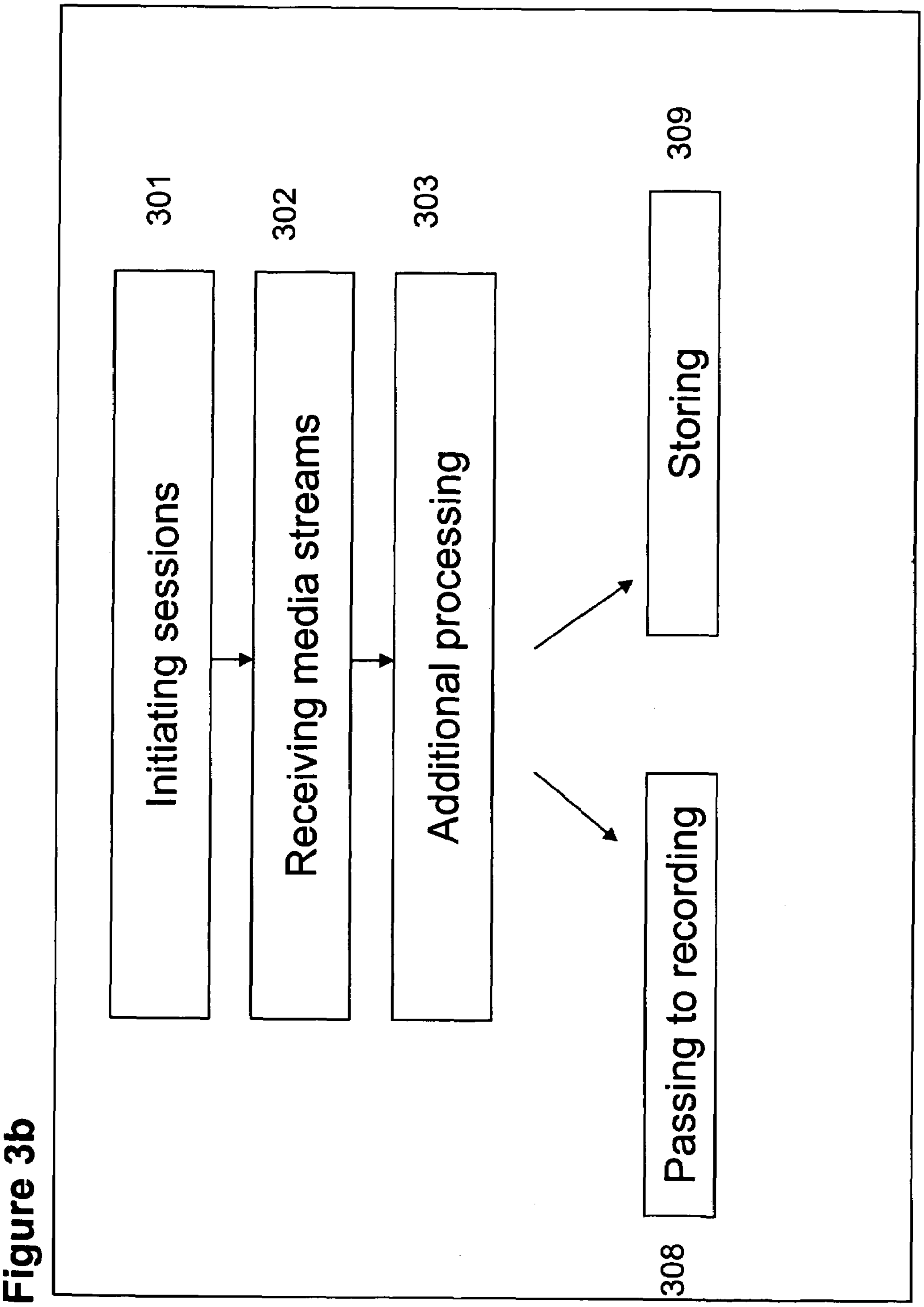
FIG. 3*b* is a flowchart illustrating a method for voice over IP (VoIP) forwarding in a network having a distributed architecture, according to a preferred embodiment of the present invention.

Reference is now made to FIG. 3*b* which is a flowchart illustrating a method for voice over IP (VoIP) forwarding in a network having a distributed architecture, according to a preferred embodiment of the present invention.

Each capture device 330 acts as a forwarding receiver, and is thus responsible for initiating the media forwarding sessions 301, receiving the media streams 302, which are forwarded from the various forwarders (forwarding devices), conducting any additional processing required 303, and for passing the streams further in the recording infrastructure to where the streams are stored for further use 308. Alternatively the capture device may store the streams by itself 309.

The forwarding manager 310 is at the center of the distributed control architecture.

The forwarding manager 310 is responsible for providing location services, that is to say providing data regarding locations of forwarders 320 to the control infrastructure 3500. The forwarding manager 310 also provides the control infrastructure 3500 with information pertaining to the media source(s) available to each forwarder, including what the sources are, where they are located and the type of media likely to be involved.

The forwarding manager 310 tracks location of the forwarders (forwarding devices) 320 and all the media sources which are accessible to each forwarder 320. The forwarding location 310 manager provides information regarding the tracked forwarders and the media sources accessible to each forwarder 320 to the capture devices 330. The information may enable the capture devices 330 to handle the forwarding control in an intelligent and efficient manner.

The forwarder 320 notifies the forwarding manager 310 about the presence of the forwarding device 320, its location, and the media sources which are accessible by the forwarder 320.

The forwarding manager 310 may receive a request for recording that identifies a specific media source from the control infrastructure 3500. Then, the forwarding manager 310 provides information listing the forwarders 320 having access to the specific media source to the control infrastructure 3500.

The control infrastructure 3500 may then trigger a capture device 330 to initiate a media forwarding session from one or more of the listed forwarders 320 for the specific media source. Optionally, the forwarder 320 is selected from those shown to be available by the control infrastructure 3500 according to a predefined policy.

With the distributed architecture, the capture device 330 initiates, manages, and terminates the forwarding of the media from the media source, by the forwarder 320. That is to say, with the distributed architecture, the role of the forwarding manager 310 is only to collect and provide updated information regarding the location of forwarders 320 and the media sources which are accessible by each of the forwarders 320.

Figure 4:
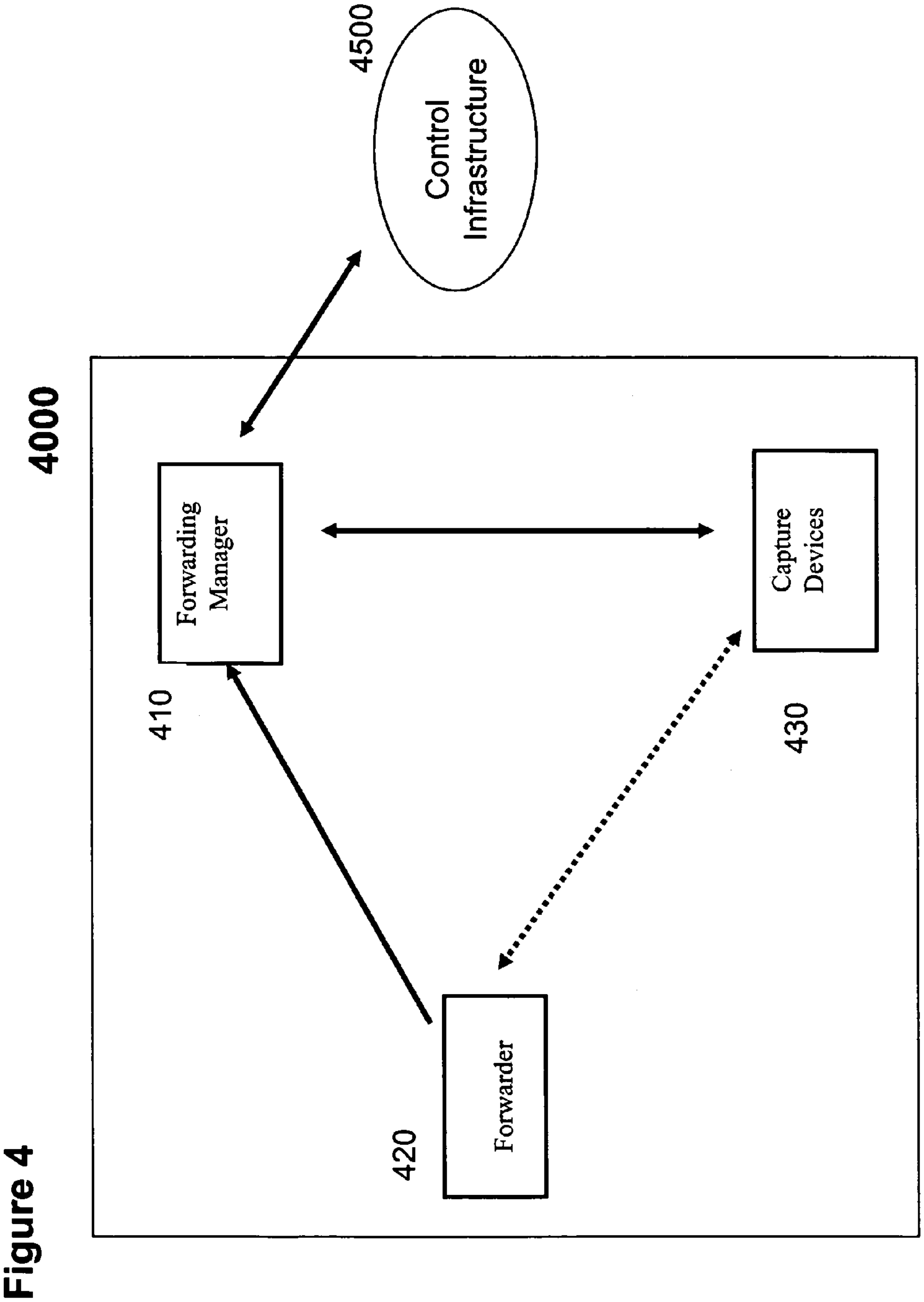
FIG. 4 is a block diagram illustrating a system for voice over IP (VoIP) forwarding in a network having a centralized architecture, according to a preferred embodiment of the present invention.

Reference is now made to FIG. 4 which is a block diagram illustrating a system for voice over IP (VoIP) forwarding in a network having a centralized architecture, according to a preferred embodiment of the present invention.

System 4000 includes one or more forwarders 420 (forwarding devices) which are configured for intercepting media and forwarding the media to one or more capture device(s) 430. Preferably, the forwarders 420 forward the media to relevant capture device(s) 430 according to a dynamic set of dispatching rules.

System 4000 further includes a centralized forwarding manager 410.

With the centralized architecture, the forwarding manager 410 collects and distributes information relating to the forwarders 420 and the media sources accessible by each of the forwarders 420. The forwarding manager 410 also manages all media forwarding sessions where data packets carrying media are forwarded from their source(s) to one or more capture device(s) 430.

The forwarding manager 410 maintains an updated picture of all available forwarders 420, as well as the media source(s) which are accessible by each of the forwarders 420.

The updated picture is available as each forwarder 420 notifies the forwarding manager 410 about the presence of the forwarding device 420, its location, and the media sources which are accessible by the forwarder 420.

Upon receiving a request identifying a specific media source from the control infrastructure 4500, the forwarding manager 410 provides information listing the forwarders 420 having access to the specific media source to the control infrastructure 4500.

The control infrastructure 4500 may select on of the listed forwarders 420 and then trigger the forwarding manager 410 to initiate a media forwarding session between the capture device 430 and the selected forwarder 420, utilizing a proxy service implemented by the forwarding manager 410.

With the centralized architecture, the forwarding manager 410 initiates, manages, and terminates the forwarding of the media from the media source, by the forwarder 420.

That is to say, with the centralized architecture, the role of the forwarding manager 410 includes collecting and providing up to date information regarding the location of forwarders 420 and the media sources accessible by each of the forwarders 420, as described hereinabove for the distributed architecture.

However, with the centralized architecture, the role of the forwarding manager 410 further includes actively managing and controlling the forwarding of VoIP data packets carrying media, from the media source(s) to the capture device(s) 430.

The Protocol

There are two aspects in the flow of media streams between the forwarding device (forwarder) 420 and other entities in the forwarding-based recording system.

A first aspect includes conducting forwarding tasks. A second aspect includes conducting advanced tasks relating to providing a forwarding-based system that has a high rate of availability, as well as reliability.

The flow of interactions is described herein below, using the distributed architecture system described hereinabove using FIG. 3*a*.

Projection to the centralized architecture described hereinabove using FIG. 4 will be apparent to the skilled man, taking into consideration the fact that the forwarding manager 410 in the centralized architecture combines the information functionality from the distributed schema, with proxy services. The proxy services enable establishment and termination of media forwarding sessions between the forwarders 420 and the capture devices 430.

The flow used in conducting the tasks of forwarding the media is built out of seven different interactions. Some of the seven interactions are initiated from the forwarder 320, and some are initiated from the capture device 330.

The interactions include the tasks of registration request, unregistration request, notifications regarding media source discovery and media source drop-out (say, discovering a new media source added to the network, or drop-out of a media source when the media source, previously present, is removed from the network), the commanding of forwarding start, the update and stop commands, as well as status and errors notifications, as described in further detail herein below.

Figure 5:
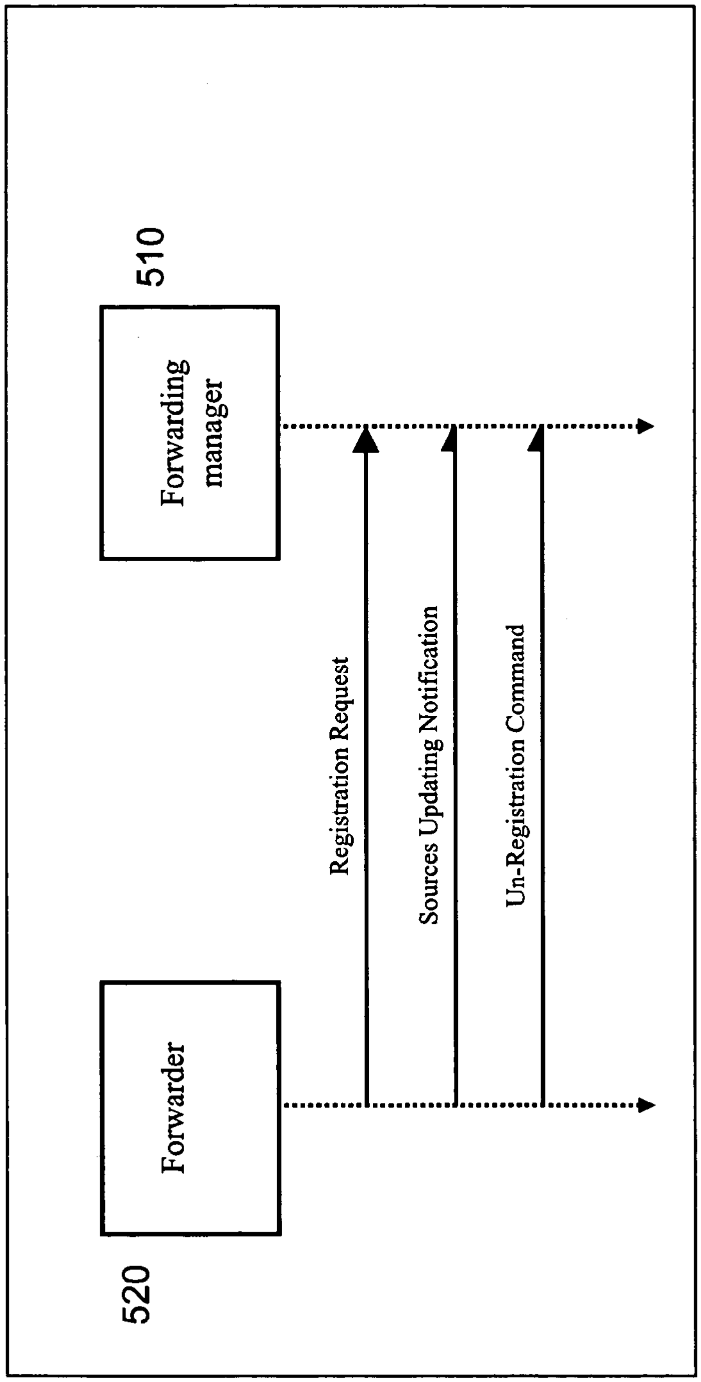
FIG. 5 is a block diagram illustrating interactions between a forwarder and a forwarding manager, according to a preferred embodiment of the present invention.

Reference is now made to FIG. 5 which is a block diagram illustrating interactions between a forwarder and a forwarding manager, according to a preferred embodiment of the present invention.

The centralized forwarding manager 510 collecting predefined information regarding all the possible forwarders 520 is not inherently scalable, as there may be several hundreds, or even thousands of forwarders 520 for the centralized forwarding manager 510 to manage.

A more scalable solution requires that each forwarder 520 is pre-configured with the address or addresses of those forwarding manager(s) 510 that the forwarder 120 is supposed to communicate with.

Using the address, the forwarding device (forwarder) 520 establishes a communication channel to the forwarding manager 510 and initiates a registration request whereby the forwarder 520 registers at the forwarding manager 510. The registration allows the forwarding manager 510 to build a dynamic online repository, containing information regarding available forwarding devices (forwarders) 520 and their associated media sources.

The forwarding manager 510 issues a response to the registration request. The response may include, apart from the standard acknowledgment, as known in the art, any other information, which is required for the on-going operation of the forwarder 520. For example, the forwarding manager 510 may be provided information describing which media source(s) is (are) accessible by the forwarder 520.

Preferably, the forwarder 520 further notifies the forwarding manager 510 about new nodes, defining possible media sources, upon their discovery, as well as existing nodes which are no longer available, links between media sources, etc, as mentioned hereinabove.

Optionally, the notification is passed to the forwarding manager 510 without any meaningful response returned from the forwarding manager 510, except for the standard receipt acknowledgment message, as known in the art. Preferably, each notification message may include several updates regarding discovering or dropping (disappearance) of nodes.

Preferably, a re-registration request is also supported by the protocol.

The re-registration request may increase the availability of the system, based on resiliency and a faster recovery process in the forwarding manager 510. The re-registration request is initiated by the forwarding manager 510 towards a known forwarder 520. The re-registration request may be used for recovering data relating to: the forwarder 520, to media sources accessible to the forwarder 520, etc. The re-registration request is discussed in further detail hereinbelow.

Once a forwarder 520 registered by the forwarding manager 510 is shut down, the forwarder 520 notifies the forwarding manager 510 about the shutting down. The notification is carried out using the un-registration command sent from the forwarder 520 to the forwarding manager 510.

Figure 6:
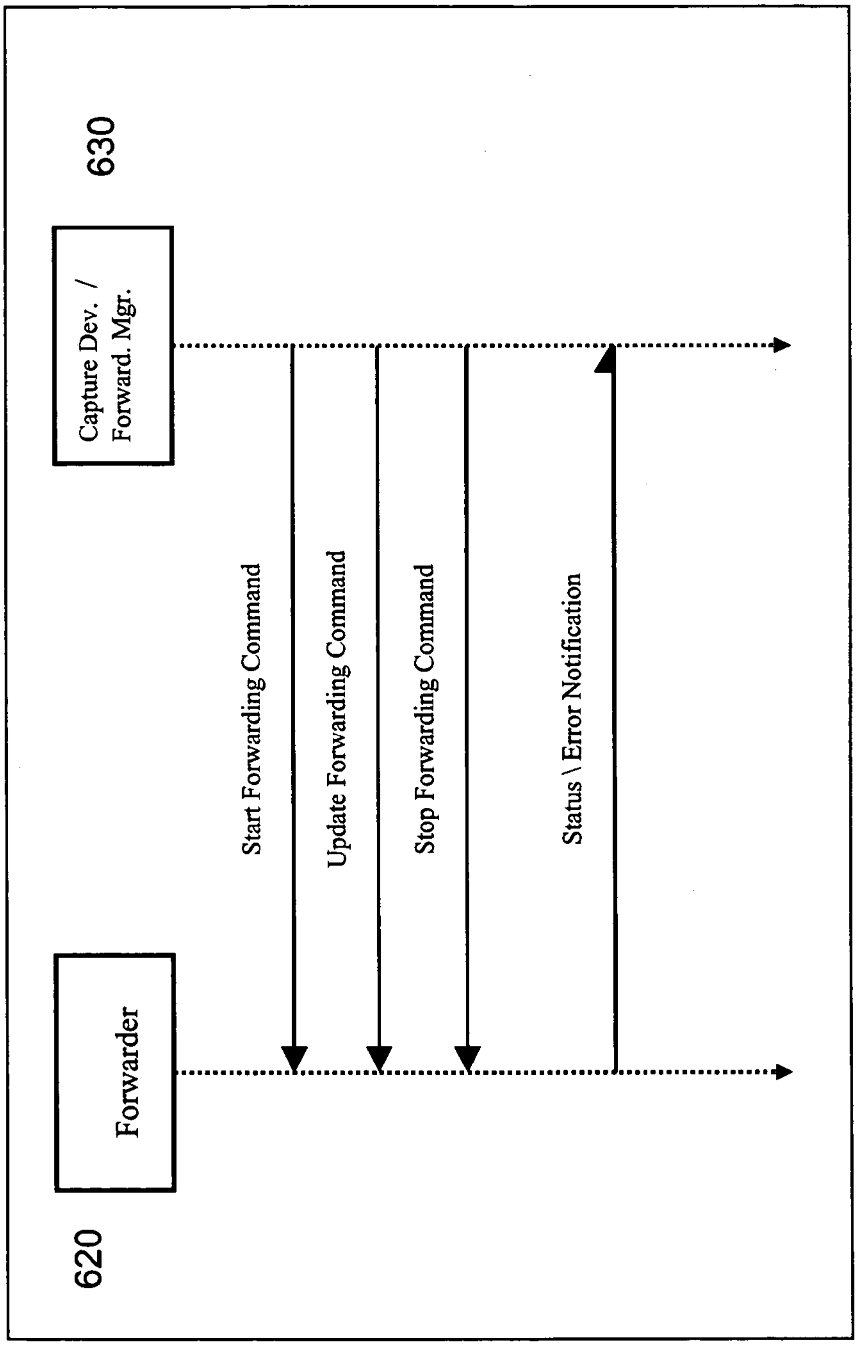
FIG. 6 is a block diagram illustrating interactions between a forwarder and a capture device (or a forwarding manager), according to a preferred embodiment of the present invention.

Reference is now made to FIG. 6 which is a block diagram illustrating interactions between a forwarder and a capture device (or a forwarding manager), according to a preferred embodiment of the present invention.

As explained hereinabove, the commands issued by the capture device 630 for controlling the forwarding in the distributed architecture, may be issued by the forwarding manager 630 in the centralized architecture.

In a distributed architecture, once a media forwarding session from a forwarder 620 to a relevant waiting capture device 630, needs to be started a start forwarding command is issued towards the forwarder 620 by the capture device 630, acting as a forwarding receiver. The capture device 630 inserts into the message bearing the command, the destination address for the forwarding, as well as any other information required to identify the media source, which is requested for forwarding, such as the media originating node.

The forwarding may be carried out in either a synchronous or an asynchronous mode.

The synchronous mode is used when the forwarding can be handled immediately. In the synchronous mode, the execution of the forwarding command is immediate. In a synchronous mode the forwarder 620 responds with the final result of the forwarding request.

The asynchronous mode is used when the forwarding command execution may take a while. In the asynchronous mode, the forwarder 620 responds with a non-final result which is later followed by a final result of the forwarding request.

In either the synchronous mode or the synchronous mode, there is provided a forwarding session identifier. The session identifier allows the recording system to identify individual sessions and distinguish between packets belonging to different sessions and may later be used for updating or stopping the individual media forwarding sessions.

The capture device 630 may issue an update forwarding command towards the forwarder, providing the forwarder 620 with updated information for the media forwarding session.

The capture device 630 issues the update forwarding command which includes the media forwarding session identifier, which was generated by the device upon the session starting, as described hereinabove. Similarly to the start forwarding command, the update forwarding command interaction may be handled in a synchronous or in an asynchronous mode, depending on the length of the operation.

For stopping an existing media forwarding session, a stop forwarding command is initiated towards the forwarder 620. The capture device 630 issues the stop forwarding command which includes the identifier of the media forwarding session to be stopped, as generated at the session establishment.

As in the case of the start forwarding and the update forwarding commands, the stop forwarding command may be handled either in a synchronous mode or in an asynchronous mode, depending on the length of the operation.

In case of an error which occurs in the forwarder 620, or the existence of a situation which may eventually cause such an error, the forwarder 620 issues a relevant error/status notification to the relevant party.

The relevant party may be the capture device 630 when the error/status is related to a media forwarding session. The relevant party may be the forwarding manager 610 when the error/status is related to the forwarder 620 device and not only to the specific session.

The notification allows the party to take the necessary correcting actions. As in the case of the node related notifications, this notification is not responded to using any meaningful response by the receiving party. Rather the receiving party responds with a standard reception acknowledgement response.

The control protocol may also contain a supplementary part, which may provide high reliability and availability, as described herein below.

Most of the tasks which are carried out according to the supplementary part are relevant only for a system designed according to the centralized controlling architecture, where the only entities involved in interactions of the forwarding control protocol are the forwarding manager 610 and the set of forwarders 620.

It may also be assumed that any information related to active media forwarding sessions is extracted more easily from the capture devices 630 then from the forwarders 620, as the number of forwarders is expected to be bigger and the interactions between the forwarders and the forwarding manager are more limited.

The description of the supplementary part given herein below relates the entities of the centralized control architecture. However, the modification needed for the distributed control architecture is apparent to one skilled in the art.

The nodes updating notification described hereinabove, includes notifications regarding node discovery and dropping. The notifications are passed from the forwarder 620 to the forwarding manager 630. The notifications enable the forwarding manager 630 to update an online repository of the media sources with the information regarding the location of forwarders and the media sources accessible by each of the forwarders 620.

However, when the forwarding manager 630 is started, there is a need to initialize the repository with the current node views from each of the forwarders 620. The initialization enables construction of a resilient forwarding system without implementing a complex system of information persistency. The known nodes query is designated to answer that need.

In the centralized architecture, the forwarding manager 630 is the party initiating media forwarding sessions from the forwarder 620 towards the capture device 630, thus fulfilling its role of a forwarding control proxy. With the centralized architecture, the forwarding manager 630 maintains the information regarding the active media forwarding sessions, which exist in the system at any moment.

However, if one forwarding manager 630 is replaced with another forwarding manager, say when a forwarding manager malfunctions, there is a need to recover the active session information.

A forwarding session query provides the ability to query each of the forwarding devices for information regarding the media forwarding sessions, which are currently active. The information is be used by the replacing manager.

Furthermore, a status query may provide a newly started forwarding manager 630 with information regarding the current status of all the forwarders 620. The information may be updated upon the reception of status and error notifications, described hereinabove. The result is a resilient system with information persistency.

Figure 7:
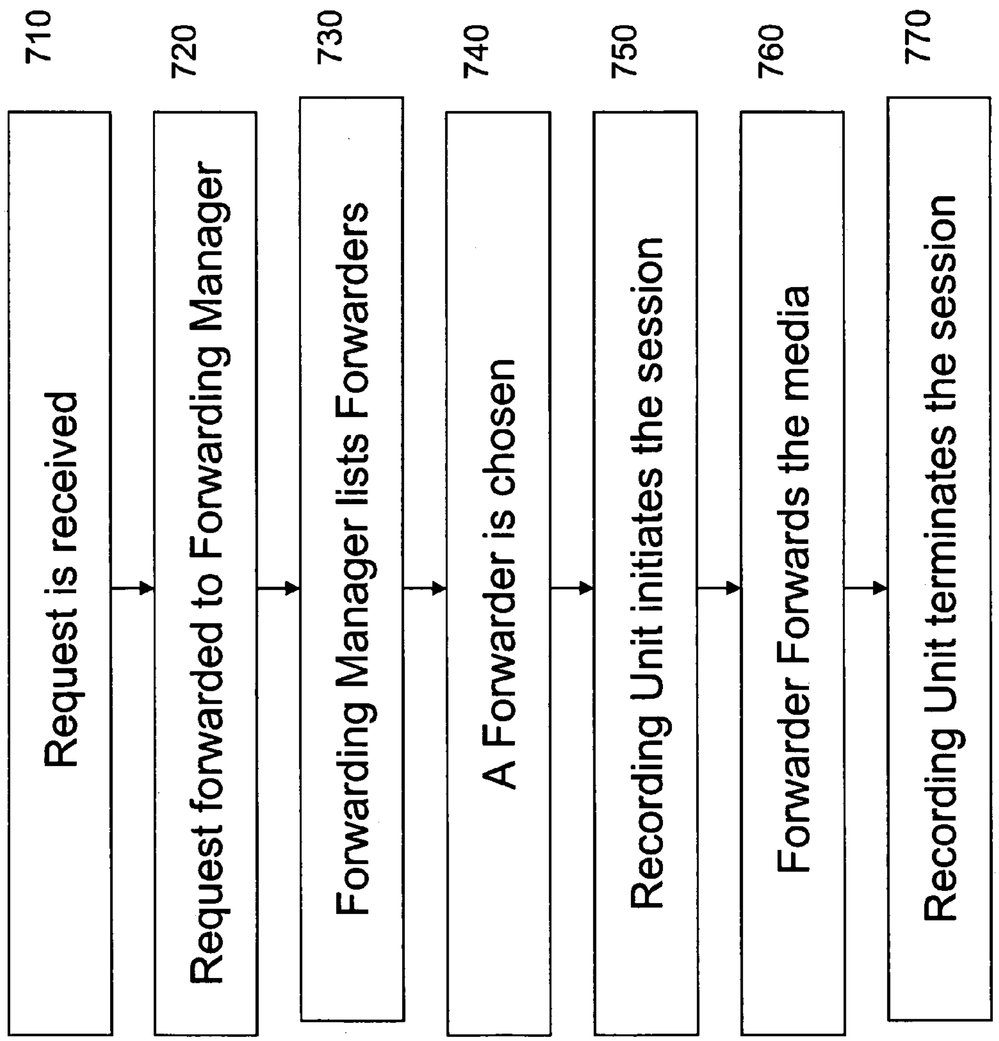
FIG. 7 is a flow chart illustrating an exemplary distributed control media forwarding scenario, according to a preferred embodiment of the present invention.

Reference is now made to FIG. 7, which is a flow chart illustrating an exemplary distributed control media forwarding scenario, according to a preferred embodiment of the present invention.

First, a request to record a certain media source to recording unit is received 710, say, from a recording management unit used for controlling the recording unit. The request is forwarded 720 to the forwarding manager 510.

Next, the forwarding manager 510 provides 730 the recording management unit with a list of forwarder(s) 520 having access to the media source. Next, the recording management unit (or an operator of the recording management unit) chooses 740 one of the forwarders 520 for carrying out the forwarding from the media source.

The recording unit initiates 750 a media forwarding session towards the selected forwarder 520.

Next, the forwarder 520 forwards 760 the media to the recording unit. When the recording management unit is instructed to end the recording, the recording unit terminates 770 the media forwarding session.

Figure 8:
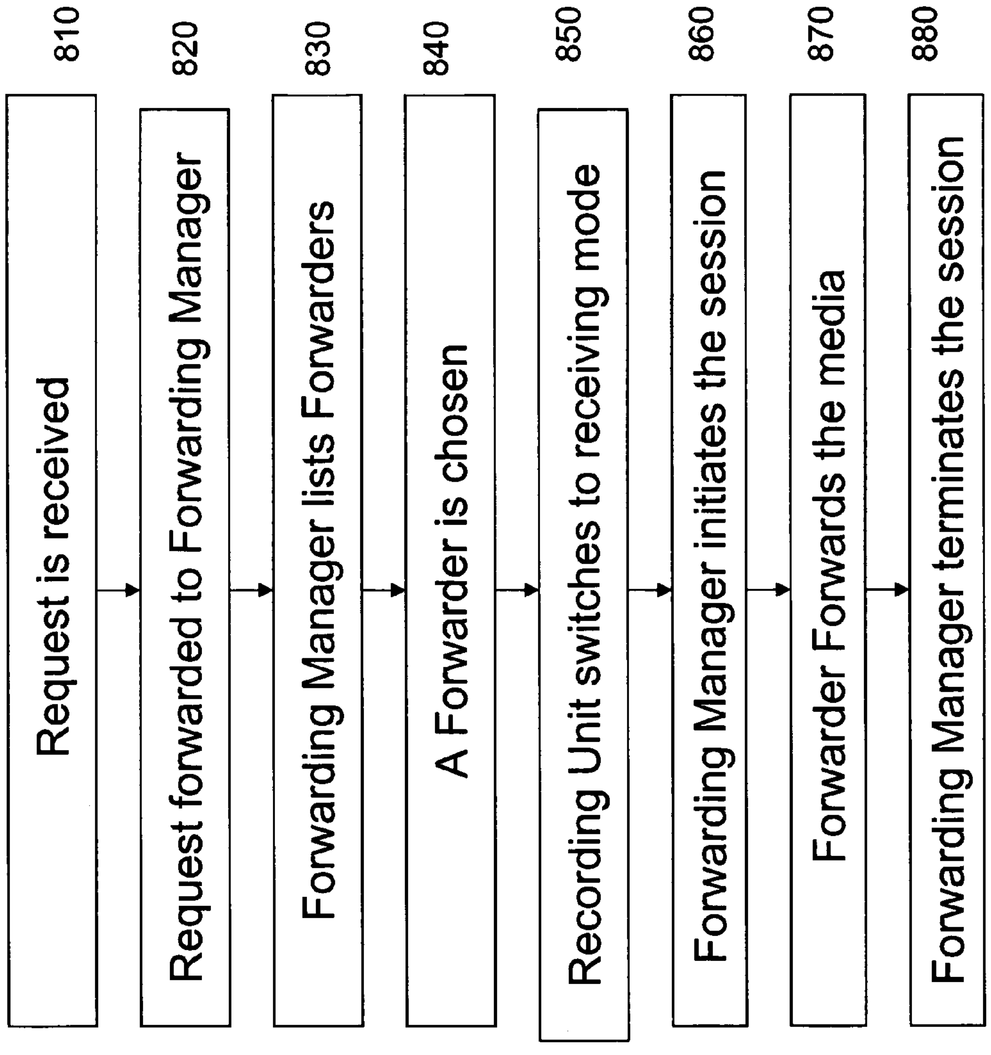
FIG. 8 is a flow chart illustrating an exemplary centralized control media forwarding scenario, according to a preferred embodiment of the present invention.

Reference is now made to FIG. 8, which is a flow chart illustrating an exemplary centralized control media forwarding scenario, according to a preferred embodiment of the present invention.

First, a request to record a certain media source to recording unit is received 810, say, from a recording management unit used for controlling the recording unit. The request is forwarded 820 to the forwarding manager 510.

Next, the forwarding manager 510 provides 830 the recording management unit with a list of forwarder(s) 520 having access to the media source.

Next, the recording management unit (or an operator of the recording management unit) chooses 840 one of the forwarders 520 for carrying out the forwarding from the media source.

Next, the recording management unit instructs 850 a recording unit to switch into a media receiving and recording mode.

Next, the forwarding manager 510 initiates 860 a media forwarding session towards the selected forwarder 520, using a proxy service implemented by the forwarding manager 510, as described hereinabove.

The forwarder forwards 870 the media to the recording unit. When the recording management unit is instructed to end the recording, the forwarding manager 510 terminates 880 the media forwarding session.

SIP as a Carrier for the Control Protocol

Optionally, the forwarding control protocol, described hereinabove, may be based on schema of an exiting protocol. The following sections describe how the Session Initiation Protocol (SIP) of the Internet Engineering Task Force (IETF) may be used as the carrier of the forwarding control protocol.

SIP is a protocol frequently used for establishing real-time calls and conferences over Internet Protocol (IP) networks. With SIP, each session may include different types of data such as audio and video, though currently most SIP extensions (parts a standard data structure used for the SIP protocol) protocol address audio communication.

SIP is a traditionally text based Internet protocol which resembles hyper text transfer protocol (HTTP) and simple mail transfer protocol (SMTP). SIP uses session description protocol (SDP) for media description.

The interactions (commands and notifications) described hereinabove, for the forwarding control protocol may be mapped into native SIP protocol request/reply transactions.

Table 1 provides and exemplary mapping of forwarding protocol interactions described hereinabove into SIP protocol transactions.

TABLE 1

| Index | Forwarding Interaction | SIP Transaction |
|---|---|---|
| 1. | Registration Request | INVITE + ACK |
| 2. | Node/Media Sources Update Notification | INFO |
| 3. | Un-Registration Command | BYE |
| 4. | Start Forwarding Command | INVITE + ACK |
| 5. | Update Forwarding Command | INVITE + ACK/UPDATE |
| 6. | Stop Forwarding Command | BYE |
| 7. | Status Notification | INFO |

The interactions of the supplementary part of the protocol utilize a defined extension to the SIP protocol data structure, introducing a new function hereinafter referred to as FWD-CTRL. The function may encapsulate in the message body a designated protocol. The designated protocol is specifically designed to handle the tasks of the supplementary interactions of the forwarding control protocol.

A basic concept in the SIP protocol is the concept of a dialog identifier. A dialog identifier is built out of information from several elements in the header of the message. The dialog identifier is used to establish a logical link between messages passed in separated SIP transactions.

The logical link established between the messages creates a logical session. The logical session is defined both in terms of the duration of the logical session, and the operating state. Conceptually, the logical session is a multi step interactions where each step is carried out using one of the messages passed in separated SIP transactions.

The forwarding protocol, carried on the SIP protocol, may use the dialog identifier as the session identifier, defining a media forwarding session between the forwarder 520 and the capture device 530.

The identifier may further define the overall logical session between the forwarder 520 and the forwarding manager 510, as known in the art.

The logical session is started upon the registration of the forwarder 520, and includes all interactions between the two entities.

The forwarding control protocol is based on several operating assumptions, which include some inherent limitations with respect to capabilities and features:

Multi-Platform Support and Multi-Vendor Support

The entities using the protocol may be developed by various vendors on several development and operating platforms. As a result, only information elements which are interoperable between all platforms are useful for the protocol.

Traverse over Firewall and NAT (Network Address Translator)\PAT (Port Address Translator) Gateways—The modern network topology provides a complex schema of network devices, such as firewalls and NAT\PAT gateways. The forwarding control protocol, as a carrier of control signaling to a network distributed system, must be able to traverse such network devices. Moreover, based on the SIP as a carrier, the forwarding protocol must be able to traverse the above network devices, using the standard techniques available to SIP devices; thus the protocol must be a STUN (Simple Traversal of UDP through NAT) or ICE (Interactive Connectivity Establishment) friendly protocol.

Independency of Underneath Transport Layer

In order to enable routing of the forwarding protocol message through existing standard SIP infrastructure the protocol does not introduce dependencies on underlying transport carriers unless the carriers already exist in the standard SIP protocol.

The following description provides some of the details of the messages in a control protocol, based on the SIP format. The messages are described according to the data elements required for the forwarding tasks, which are passed along in each message, without giving an exact formal definition.

As obvious to any person skilled in the art, the formal definition of the forwarding protocol as carried by SIP may further include additional data elements, which are required according to the specification of the SIP itself.

For example, the CSeq data element is a part of any SIP message, providing a way to identify and order the various transactions involved in a single SIP session.

As explained above, the first task which is executed by the forwarder 520, once a communication channel is established to the forwarding manager 510, is the device registration. Device registration enables the forwarding manager 510 to acquire information related to the forwarding device (forwarder) 520, which the forwarding manager needs for operating with the forwarder.

The device registration interaction is mapped to the SIP INVITE transaction, which is built out of the INVITE request and its related response, as well as the proceeding ACK SIP message.

Information, which is passed from the forwarding device (forwarder) 520 to the forwarding manager 510, includes the address of the forwarding device 520, the type of the device 520, the version of the device 520, and the capacity of the device. The response may notify registration success or failure. Registration failure may for example occur due to authentication problems or a re-routing reply.

The device un-registration request is mapped to a SIP BYE transaction, which is built out of the BYE request and its related response. Information, which is passed from the forwarding device to the controller, includes a BYE request allowing identifying the session which is being terminated.

It is emphasized, though, that among the standard header-elements, passed in an INVITE request, there is the Supported field, which provides indications regarding extensions supported by the entity. The supported field is declared as a field that may be sent, yet entities receiving SIP messages need to be prepared for messages without the field." The field is useful for efficient handling of the recording system. The forwarding devices manager, which is the target of the forwarding control session, propagates the information to other parties in the recording system, involved in SIP-based forwarding interactions Conceptually, the device registration request may used to define a new dialog identifier. The new dialog identifier identifies a general dialog between the forwarding manager 510 and the forwarding device 520. This session, which is established in the registration request, is terminated by the un-registration command.

The registration request and un-registration request are mapped to the SIP INVITE and BYE transactions, as indicated by Table 1 hereinabove.

Table 2 summarizes the information, brought in the previous paragraphs, regarding the device registration task and its mapping to the SIP transactions.

TABLE 2

| Index | Data Element | Description | Remarks |
|---|---|---|---|
| 1. | From: | The forwarding device issuing the registration request. | |
| 2. | To: | The forwarding location manager targeted | |
| 3. | Call-ID: | The initiator forwarding device given identifier of the new session. | |
| 4. | Fwd-Device: | The type and version of the forwarding device. | A forwarding protocol extension. |
| 5. | Fwd-Capacity: | The capacity of the forwarding device | A forwarding protocol extension. |
| 6. | Fwd-Characteristics | The characteristics of the forwarding device | A forwarding protocol extension. |
| 7. | Fwd-Info-Limit | Limitations regarding the size of information carried in the SIP INFO message | |

A partial example of the registration related messages is:

```
INVITE sip:FwdMgr@nice.com SIP/2.0
...
To: NICE Fwd-Mgr <sip:FwdMgr@nice.com>
From: VRG-7005 <sip:VRG-7005@some-location.com>;tag=47931
Call-ID: 123456789@VRG-7005@ some-location.com
...
Fwd-Device: VRG <VRG 1.3>
Fwd-Capacity: 4000 rules
Fwd-Characteristics:
...
SIP/2.0 200 OK
...
To: NICE Fwd-Mgr <sip:FwdMgr@nice.com>;tag=85937
From: VRG-7005 <sip:VRG-7005@some-location.com>;tag=47931
Call-ID: 123456789@VRG-7005@ some-location.com
...
BYE sip:FwdMgr@nice.com SIP/2.0
...
To: NICE Fwd-Mgr <sip:FwdMgr@nice.com>;tag=85937
From: VRG-7005 <sip:VRG-7005@some-location.com>;tag=47931
Call-ID: 123456789@VRG-7005@ some-location.com
...
SIP/2.0 200 OK
...
```

The notifications regarding nodes discovery and drop-out are designed to provide the forwarding manager 510 with information describing the sources of media which are accessible from the forwarding device 520. The information enables the forwarding manager 510 to take (or support) intelligent decisions regarding which device to use for forwarding a needed media stream, as well as to handle the forwarding resources management efficiently.

The notification interactions, initiated from the forwarding device (forwarder) 520 towards the forwarding manager 510, are mapped to the INFO SIP transaction. The INFO SIP transaction is built out of the INFO request and its related response.

Information, which is passed in those INFO transactions, includes the device identity. The information further includes a list of identifiers to possible media sources, each of them accompanied with an indication as to whether it is a just discovered source or a dropped source.

Table 3 summarizes information brought in the previous paragraphs, regarding the address update notification tasks and their mapping to the SIP INFO transaction.

TABLE 3

| Index | Data Element | Description | Remarks |
|---|---|---|---|
| 1. | From: | The forwarding device issuing the info notification. | |
| 2. | Fwd-Source: | Information regarding a node related to the forwarding and its updated status. | A forwarding protocol extension. Content according to the schema of the contact field in the SDP. |
| 3. | Fwd-Sources-Link: | Information regarding a linkage between two nodes related to the forwarding and its updated status. | A forwarding protocol extension. Content according to the schema of the contact field in the SDP. |

A partial example of the address notification related messages is:

```
INFO sip:FwdMgr@nice.com SIP/2.0
...
From: VRG-7005 <sip:VRG-7005@some-location.com>;tag=47931
...
Fwd-Source: IN IP4 129.168.240.201, Discovered
Fwd-Source: IN IP4 129.168.240.202, Discovered
Fwd-Source: IN IP4 129.168.240.105, Dropped
...
SIP/2.0 200 OK
...
From: VRG-7005 <sip:VRG-7005@some-location.com>;tag=47931
...
```

The media forwarding sessions, in which media is forwarded from the forwarding device 520 to a capture device 530, are controlled by the start forwarding, update forwarding and stop forwarding interactions.

The above interactions may be initiated from the forwarding manager 510 towards the forwarding device (forwarder) 520.

The start forwarding and update forwarding interactions are mapped to the INVITE transaction of the SIP protocol, which is built out of the INVITE request, along a following response and an ACK acknowledgment message.

Optionally, the update forwarding interaction may also be mapped to the UPDATE transaction of the SIP protocol.

The stop forwarding interaction is mapped to the BYE transaction of the SIP protocol, which is built out of the BYE request, a corresponding response message, and a corresponding acknowledgement message which follow the request.

Information, which is passed in the start forwarding interaction, as well as in the update forwarding interaction, includes the definition of the involved forwarding manager 510 and forwarding device 520 as well as the call identifier. The call identifier is used to define a new or an existing dialog.

The information further includes the source of the media to forward, as well as the address of the capture device 530. The capture device 530 is the target of the forwarding task. Additional information includes options for the handling the forwarding task. Optionally, the information may be carried in a start-forwarding or an update-forwarding SIP transaction. Optionally, the information may be encapsulated in a fwd-context field in an header of an SIP message.

All these information elements are passed in the header of the SIP messages except the information regarding the forwarding target, which is passed as a session description protocol (SDP) message body.

The information, which is passed in the stop forwarding interactions includes: the involved forwarding manager 510, the involved forwarding device 520, and the call identifier. The call identifier is required to define the dialog, identifying the session, which is requested to be terminated.

Table 4 summarizes the information, presented in the previous paragraphs, regarding the start\update forwarding tasks and their mapping to the SIP INVITE transaction, as well as the stop forwarding task and its mapping to the SIP BYE transaction:

TABLE 4

| Index | Data Element | Description | Remarks |
|---|---|---|---|
| 1. | From: | The forwarding controller issuing the invite request. | |
| 2. | To: | The forwarding device carrying the forwarding task. | |
| 3. | Call-ID: | The initiator given identifier of the new session. | |
| 4. | Fwd-Source: | Information regarding the source of the media to forward. | A forwarding protocol extension. Content according to the schema of the contact field in the SDP. |
| 5. | Fwd-Options: | Options settings of the forwarding task. | A forwarding protocol extension. |
| 6. | Fwd-Context: | External context related to the forwarding session | A forwarding protocol extension. |

A partial example of the address notification related messages is:

```
INVITE sip: VRG-7005@some-location.com SIP/2.0
...
To: VRG-7005 <sip:VRG-7005@some-location.com>
From: NICE Fwd. Controller <sip:FwdCtrl@nice.com>;tag=54931
Call-ID: 123456789@FwdCtrl@nice.com
...
Fwd-Source: IN IP4 129.168.240.201, Rx
Fwd-Source: IN IP4 129.168.240.201, Tx
Fwd-Options: Transmission mode=Advanced; Security mode=Encrypted
Fwd-Context: Receiver = Capture 1107; Session = 23987...
Content-Type: application/sdp
...
v=0
o=FwdCtrl 2890844526 2890842807 IN IP4 FwdCtrl@nice.com
s=forwarding media task
c=IN IP4 192.168.105.107/127
t=0 0
m=audio 49170 RTP/AVP 0 8 18 4
m=audio 49172 RTP/AVP 0 8 18 4
SIP/2.0 200 OK
...
To: VRG-7005 <sip:VRG-7005@some-location.com>;tag=78911
From: NICE Fwd. Controller <sip:FwdCtrl@nice.com>;tag=54931
Call-ID: 123456789@FwdCtrl@nice.com
ACK sip: VRG-7005@some-location.com SIP/2.0
...
To: VRG-7005 <sip:VRG-7005@some-location.com>;tag=78911
From: NICE Fwd. Controller <sip:FwdCtrl@nice.com>;tag=54931
Call-ID: 123456789@FwdCtrl@nice.com
...
BYE sip: VRG-7005@some-location.com SIP/2.0
...
```

-continued

```
To: VRG-7005 <sip:VRG-7005@some-location.com>;tag=78911
From: NICE Fwd. Controller <sip:FwdCtrl@nice.com>;tag=54931
Call-ID: 123456789@FwdCtrl@nice.com
...
SIP/2.0 200 OK
...
To: VRG-7005 <sip:VRG-7005@some-location.com>;tag=78911
From: NICE Fwd. Controller <sip:FwdCtrl@nice.com>;tag=54931
Call-ID: 123456789@FwdCtrl@nice.com
```

Notifications regarding errors and status changes are designed to provide the forwarding manager 510 with the ability to learn the on-going status of the forwarding devices 520 controlled by the forwarding manager 510.

The information enables the forwarding manager 510 to choose one of the forwarding devices 520, for forwarding a needed media stream, as well as to handle the forwarding resources management efficiently.

The interactions, initiated from the forwarding device (forwarder) 520 towards the forwarding manager 510, are mapped to the INFO SIP transaction. The INFO SIP transaction is built out of the INFO request and its corresponding response.

The information, passed in those INFO transactions, includes, besides the device identity and other data elements needed to identify the relevant dialog, a list of status changes and error notifications.

The messages, exchanged as part of these interactions, belong to the general SIP dialog (if the messages concern the forwarding device 520 in general), or to a specific dialog identifying a media forwarding session (if the messages concern a specific forwarding task).

Table 5 summarizes the information, discussed in the previous paragraphs, regarding the address update notification tasks and their mapping to the SIP INFO transaction.

TABLE 5

| Index | Data Element | Description | Remarks |
|---|---|---|---|
| 1. | From: | The forwarding device issuing the info notification. | |
| 2. | To: | The forwarding controller receiving the notification. | |
| 3. | Fwd-Status: | Information regarding an error or a status notification related to the forwarding device. | A forwarding protocol extension. |

A partial example of the address notification related messages is:

```
INFO sip:FwCtrl@nice.com SIP/2.0
...
To: NICE Fwd. Controller <sip:FwdCtrl@nice.com>;tag=54931
From: VRG-7005 <sip:VRG-7005@some-location.com>;tag=78911
Call-ID: 123456789@FwdCtrl@nice.com
...
Fwd-Status: 135 failed forwarding media to target
...
SIP/2.0 200 OK
...
To: NICE Fwd. Controller <sip:FwdCtrl@nice.com>;tag=54931
From: VRG-7005 <sip: VRG-7005@some-location.com>;tag=78911
Call-ID: 123456789@FwCtrl@nice.com
...
```

The following paragraphs present the details of the remaining messages of the control protocol, which are supplementary interactions.

As described hereinabove, the supplementary interactions are mapped to a new SIP method (which may be named FWD-CTRL). The new method and the elements in the messages headers are encapsulated in the messages body as a designated protocol.

The designated protocol is specifically designed to handle the tasks of the supplementary interactions of the forwarding control protocol.

The supplementary control procedures are required in order to enable the forwarding manager 510 to detect the current status of the forwarding device(s), usually after a communication breakdown or a system crash in the forwarding manager 510.

Information provided through the supplementary transactions may include: a list of node accessible by the forwarding device (forwarder) 520, a list of currently active media forwarding sessions along with their status, and an overall status of the forwarding device (forwarder) 520.

Optionally, the list of nodes, currently accessible by the forwarding device 520, is assembled by conducting a bulk enumeration process.

The bulk enumeration is triggered by an initiation transaction issued by the forwarding manager 510, stating the information to enumerate, as well as the enumeration restrictions. Next, the forwarder 520 issues a set of SIP transactions. Each transaction encapsulates a bulk of entries, along with and indication if this is the last transaction in the enumeration session.

Optionally, the forwarding manager 510 limits the size of information carried in each of the transactions. Preferably, the forwarding manager 510 influences the timing of the information transmission, thus avoiding overflow. The forwarding manager 510 may influence the timing of information transmission using an asynchronous pattern of provisional response followed by a final response. The final acknowledgement response to each of the information passing transaction is sent only when the forwarding manager 510 is available for handling the next transaction.

Preferably, the controller is prepared to receive notifications, regarding the nodes, which are spotted by the forwarding device after the enumeration process has started, as well as addresses, which are dropped out of the list.

Getting the current overall status of the device, along with the list of active media forwarding sessions, as well as their status is likewise achieved, by conducting a bulk enumeration process, similar to the process described hereinabove.

The FWD-CTRL method, belonging to the forwarding extension to the SIP standard, designing to provide control over forwarding devices 520, answers all the tasks, which are part of the supplementary control flow, just discussed above.

Information, which may be passed in the request initiated by the forwarding manager 510, includes a possible indication that a status query is requested, either regarding the overall status of the forwarding device or regarding a certain media forwarding session (identified using the session identifier described hereinabove).

Optionally, the request may include information related to the next bulk from the list of addresses and\or the list of active sessions requested.

Information, which is returned in the response, may include the requested status (if requested).

The response may also include a message body encapsulating the information regarding the addresses and\or the sessions, in an XML message format. The XML message body may be a part of an INFO message related to the FWD-CTRL method described hereinabove. The schema of the XML message body is demonstrated in the following example:

```
<ForwardingInfo>
  <NodesSeen>
    <MediaSource/>
  </NodesSeen>
  <LinksSeen>
    <MediaSourcesLink>
      <MediaSource/>
      <MediaSource/>
    </MediaSourcesLink>
  </LinksSeen>
  <ForwardingSessions>
    <Session Call-ID="">
      <Context Receiver="" Session=""/>
      <Stream MediaSource="" MediaTarget=""/>
      <Status/>
    </Session>
  </ForwardingSessions >
</ForwardingInfo>
```

Table 7 summarizes the information, presented in the previous paragraphs, regarding the device registration task and its mapping to the SIP FWD-CTRL transaction.

TABLE 7

| Index | Data Element | Description | Remarks |
|---|---|---|---|
| 1. | To: | The forwarding device, which is the target of the control request. | |
| 2. | From: | The forwarding controller issuing the control request. | |
| 3. | Call-ID: | The identifier of the call, which is part of the relevant dialog. | |
| 4. | Fwd-Ctrl-Task: | The control task, which is requested from the device. | A forwarding protocol extension. |
| 5. | Fwd-Ctrl-Result: | A control task execution result. | A forwarding protocol extension. |
| 6. | Fwd-Status: | Information regarding an error or a status notification related to the forwarding device. | A forwarding protocol extension. |

The following table 8 summarizes the information, which was brought in the previous paragraphs, regarding the device query task and its mapping to the SIP INFO transactions:

TABLE 8

| Index | Data Element | Description | Remarks |
|---|---|---|---|
| 1. | To: | The forwarding controller, which is the target of the information passing. | |
| 2. | From: | The forwarding device issuing the information passing. | |
| 3. | Call-ID: | The identifier of the call, which is part of the relevant dialog. | |
| 4. | Fwd-Ctrl-Status: | Information regarding the status of the handling of the information passing. | A forwarding protocol extension. |

A partial example of the messages is:

```
FW-CTRL sip:VRG-7005@some-location.com SIP/2.0
...
To: VRG-7005 <sip:VRG-7005@some-location.com>
From: NICE Fwd. Controller <sip:FwCtrl@nice.com>
...
```

-continued

```
Fwd-Ctrl-Task: Query Status, Query Nodes; Size=200, Query Sessions;
Size=50
...
SIP/2.0 200 OK
...
To: VRG-7005 <sip:VRG-7005@some-location.com>
From: NICE Fw. Controller <sip:FwCtrl@nice.com>
...
Fwd-Status: 0 OK
Fwd-Ctrl-Result: Query Status; Status=OK, Query Nodes; Status=Initiated,
  Query Sessions; Status=Initiated
...
INFO sip:FwCtrl@nice.com SIP/2.0
...
To: NICE Fwd. Controller <sip:FwCtrl@nice.com>
From: VRG-7005 <sip:VRG-7005@some-location.com>
...
Fwd-Ctrl-Status: Query Nodes; Size=200; LastSection=false,
  Query Sessions; Size=50; LastSection=false
...
Content-Type: application/fwd-ctrl
...
<ForwardingInfo>
  <NodesSeen>
      <MediaSource IN IP4 192.168.240.201/>
      ...
  </NodesSeen>
  <ForwardingSessions>
      <Session Call-ID="123456789@FwdCtrl@nice.com">
        <Context Receiver="Capture1107" Session="239876"/>
        <Stream
          MediaSource="IN IP4 129.168.240.201; Rx"
          MediaTarget="IN IP4 192.168.105.107:49170"
        />
        <Stream>
          MediaSource="IN IP4 129.168.240.201; Tx"
          MediaTarget="IN IP4 192.168.105.107:49172"
        />
      </Session>
      ...
    </ForwardingSessions>
</ForwardingInfo>
SIP/2.0 200 OK
...
To: NICE Fwd. Controller <sip:FwdCtrl@nice.com>
From: VRG-7005 <sip:VRG-7005@some-location.com>
...
INFO sip:FwCtrl@nice.com SIP/2.0
...
To: NICE Fwd. Controller <sip:FwCtrl@nice.com>
From: VRG-7005 <sip:VRG-7005@some-location.com>
...
Fwd-Ctrl-Status: Query Nodes; Size=33; LastSection=true,
  Query Sessions; Size=7; LastSection=true
...
Content-Type: application/fwd-ctrl
...
SIP/2.0 200 OK
...
To: NICE Fwd. Controller <sip:FwdCtrl@nice.com>
From: VRG-7005 <sip:VRG-7005@some-location.com>
...
...
Re-registration based fast recovery
```

The concept is to enhance and speed up the recovery process of the system after a down-time, either due to malfunctionality or planned shut-down.

Optionally, upon a system failure, the forwarder 520 may establishes a control session towards the forwarding manager 510, which preferably minimizes the configuration requirements set for the forwarding manager 510.

Preferably, the control session is re-established from the forwarding manager 510 towards the forwarder 520, thus skipping periodic intervals in which the forwarder 520 retries to re-register. Consequently, an advanced recovery scheme is provided by the forwarding manager 510.

Preferably, the forwarding manager 510 has a persistent repository, valid also between process running-sessions.

The persistent repository keeps a list of known forwarders 520. The list of known forwarders 520 is updated with each change in the forwarders 520 and their location. The list enables the forwarding manager 510 to start re-registration of the media forwarding control sessions towards the listed forwarders 520, immediately upon starting-up after a system failure, etc, thus allowing the advanced recovery scheme.

A forwarder 520, which does not support the enhanced scheme, rejects the session establishment, and provides a non-supported indication as the reason for the rejection. For example, a forwarder 520 not supporting the enhanced scheme may issue a non-implemented message (say using return-code No. 501 of the standard SIP protocol).

The enhanced re-registration scheme described above may lead to a possible race condition. The race condition occurs when a forwarding manager 510 tries to re-establish a forwarding control session towards a forwarder 520, and the forwarder 520 itself tries to re-establish the same forwarding control session towards the forwarding manager 510.

When the race condition occurs, the forwarding manager 510 cancels the attempt to re-establish a media forwarding control session towards the forwarder 520. The forwarder 520 also rejects the request to re-establishment the media forwarding session, initiated by the forwarding manager 510.

According to a preferred embodiment, the enhanced recovery scheme is implemented using SIP protocol INVITE transactions.

A re-establishment of the forwarding control session towards a known forwarder 520, after a start-up of the forwarding manager 510, is done within the same SIP dialog of the previous media forwarding control session, prior to the failure of the system.

The header elements, which are added to the standard INVITE request message as a part of the forwarding request described hereinabove, are also used for the INVITE message sent by the forwarding manager 510 when re-establishing the media forwarding session.

The content of the headers is based on the information, received from the forwarder 520 prior to the failure. Accuracy and validity of the information is verified by the forwarder 510. If the information is found inaccurate or invalid, the forwarder 520 issues a client error class response, as defined by the standard SIP protocol (For example, a Bad Request SIP status code No. 400).

If the race condition described above occurs, the forwarding manager 510 issues an SIP CANCEL message. The forwarder 520 may return an SIP Temporary unavailability (SIP status code No. 480). Usage of SIP Built-In Mechanisms Preferably, a number of built-in mechanisms, which are provided as part of the SIP protocol, as well as its standard extensions, are used as part of the forwarding control protocol.

The mechanisms may include but are not limited to:

Session Aliveness—Monitoring of the aliveness of the SIP sessions can be handled using the session timer extension to the SIP (RFC4028). The procedure for handling of session aliveness monitoring is discussed in further detail hereinbelow. The procedure may be implemented as a part of the forwarding control protocol, both regarding the forwarding control and the media sessions.

User-User Authentication—The SIP provides, as part of the standard, a flow to achieve authentication between two user-agents interacting in a session. The flow is defined in section 22.2 of the SIP standard (RFC3261). The usage of this authentication schema, as part of the forwarding control protocol, is discussed in further detail hereinbelow.

SIP Message Signature—The SIP provides, as part of the standard, a concept of how signed messages, passed between two user-agents interacting in a session, may be prepared by the sending party and verified by the receiving party. The handling is defined in section 23 of the SIP standard (RFC3261). An additional relevant extension, known as the SIP Authenticated Identity Body (AIB), is declared in RFC3893. The usage of such a signature mechanism, as part of the forwarding control protocol, is discussed in further detail hereinbelow.

SIP Mobility—The SIP provides, as part of the standard, a concept of agents' mobility. The concept allows registering several physical contacts, representing hosting machines, under the same logical contact, known as the Uniform Resource Indicator (URI). Such a mobility concept, which is defined in section 10 of the SIP standard (RFC3261), is used mainly for achieving better availability in the recording system. The usage of SIP mobility to provide high-availability in the recording system, as well as a description of the various resiliency levels is discussed in further detail hereinbelow.

Glossary of Terms

Forwarding—The act in which a media stream is actively passed to a recording system, thus relieving its recording infrastructure from the task of intercepting the media.

Using forwarding-based recording separates between the tasks of media interception and media processing. Media interception is done solely by the forwarding device (forwarder). The task of media processing, organizing and storing (or recording) for further usage, is done by other components of the recording system, specifically-the capture devices.

Forwarding Device (or a Forwarder)—An entity, which has the ability to intercept voice over IP (VoIP) or voice traffic, extract the voice over IP (VoIP) or voice traffic, and then pass the voice traffic to the relevant capturing device (either directly or via another device).

The control of the forwarding actions, as well as the general handling of the forwarding device (forwarder) are carried out using a predefined forwarding control protocol, as described in further detail hereinbelow. Examples of forwarding devices include, but are not limited to: a VoIP Recording Gateway, an IP forwarding agent, recording enabled IP phones, etc.

Forwarding receiver—An entity, which is the initiator of forwarding media requests, targeted at various forwarding devices. The entity enables receiving media streams and inserting the streams into a recording system. One non-limiting example of a forwarding receiver is an IP capture hosted on an IP logger machine.

Forwarding Manager (also referred to as a Forwarding Device Manager or as a Forwarding Location Manager). An entity which interacts with all the forwarding devices (forwarders), and constantly gets from the forwarders the sources of media accessible by each forwarder. The Forwarding Location Manager keeps an updated picture of the list of active forwarding devices, as well as their forwarding abilities. The picture enables other components in the system to take intelligent actions in order to conduct the capturing carried out by forwarding.

Forwarding Controller—combines the role of the forwarding location manager, as described hereinabove, with forwarding controlling.

The Forwarding controller may be responsible for initiating and terminating the forwarding of the VoIP data packets (or data units). The Forwarding Controller may manage the forwarding utilizing a forwarding control protocol. Typically, the protocol distinguishes between two types of entities: forwarding devices and all other entities. The forwarding controller may be task oriented, only involved in interactions related to handling of a specific task, or the controller may function as a general controller which is involved in multiple task handling, as described herein below.

Optionally, a preferred embodiment of the present invention is implemented in a distributed architecture where a centrally position Forwarding Manager takes the role of the Forwarding Location Manager, as described in hereinabove.

Optionally, the present embodiments are implemented in a centralized architecture where a centrally positioned Forwarding Manager takes both the role of the Forwarding Device Manager and the role of the Forwarding Controller, described hereinabove Media Source—A distinct source of media intended to be recorded by the recording system. Examples of media sources include a unique device id, a phone extension, the combination of a trunk and a specific timeslot, as well as the IP address or MAC (Media Access Control) address of an IP phone.

Media Provider—An entity, which provides a media stream (VoIP data packets), passed to a media target, as part of a media forwarding session. The media provider role is a distinct role of the forwarding device, just defined above, yet other entities can also assume this role, as part of building a complex store and forward system.

Media Target—An entity which accepts a media stream passed from a media provider as part of a media forwarding session. The media target role is a distinct role of the forwarding receiver just defined above, yet other entities can also assume this role, as part of building a complex store and forward system.

Media forwarding session—A session conducted between a distinct media provider, which is usually a forwarding device (Forwarder), and a distinct media target, usually a forwarding receiver being a capture device.

Table 9 lists external documents related SIP and other standards bearing relevance to present embodiments

| Idx | Document | Description & Remarks |
|---|---|---|
| 1. | SIP: Session Initiation Protocol | IETF RFC3261, which defines the SIP 2.0 standard. |
| 2. | SDP: Session Description Protocol | IETF RFC2327, which defines the SDP standard. |
| 3. | The SIP INFO Method | IETF RFC2976, which defines the INFO method, as an extension to the SIP standard. |
| 4. | The Session Initiation Protocol (SIP) UPDATE Method | IETF RFC3311, which defines the UPDATE method, as an extension to the SIP standard. |
| 5. | Session Timers in the Session Initiation Protocol (SIP) | IETF RFC4028, which adds the 'Session Timers' extension to the SIP standard |

-continued

| Idx | Document | Description & Remarks |
|---|---|---|
| 6. | Session Initiation Protocol (SIP) Authenticated Identity Body (AIB) Format | IETF RFC3893, which defines the AIB extension, dealing with partial messages signature, to the SIP standard. |
| 7. | RTP: A Transport Protocol for Real-Time Applications | IETF RFC3550, which defines the RTP standard. |
| 8. | RTP Profile for Audio and Video Conferences with Minimal Control | IETF RFC3551, which defines the standard profile of audio and video applications, using the RTP as a media transmission carrier. |
| 9. | Hypertext Transfer Protocol - HTTP/1.1 | IETF RFC2616, which defines version 1.1 of the HTTP, used as a key contributor for the definition of the SIP standard. |
| 10. | Secure/Multipurpose Internet Mail Extensions (S/MIME) Version 3.1 Message Specification | IETF RFC3851, which defines the S/MIME version 3.1 standard, used for securing SIP messages. |

Table 9 The forwarding extension defines two types of sessions, which are stretched between the forwarding device and other components, belonging to the forwarding-based recording system. These sessions include the forwarding control session and the forwarding media sessions.

The following sub-sections describe the flow of SIP messages, which are passed as part of these sessions.

Forwarding Control Session

The forwarding control session, which is initiated by the forwarding device towards the forwarding location manager, is started in a session establishment interaction. The interaction comprises a modified INVITE transaction, along with the accompanying ACK request, and ends in a session termination interaction, which is based on the standard BYE transaction.

In between, the session is based on modified INFO transactions, initiated by the forwarding device to notify changes in the list of media sources seen by the forwarding device, as well as to notify errors of the forwarding device while operating.

Definition of Messages Syntax

Apart from these messages, which compose the elementary flow of the forwarding control protocol, there may be initiated advanced control actions, which are supported as part of the supplementary flow of the forwarding control protocol.

The tasks are based on the additional FWD-CTRL method, encapsulated in the relevant transaction initiated by the forwarding location manager, which is used to either conduct the requested action or to trigger its execution in the forwarding device.

Such a triggering, is followed by a set of additional modified INFO transactions, initiated by the forwarding device, thus passing the requested information to the forwarding location manager.

Figure 9:
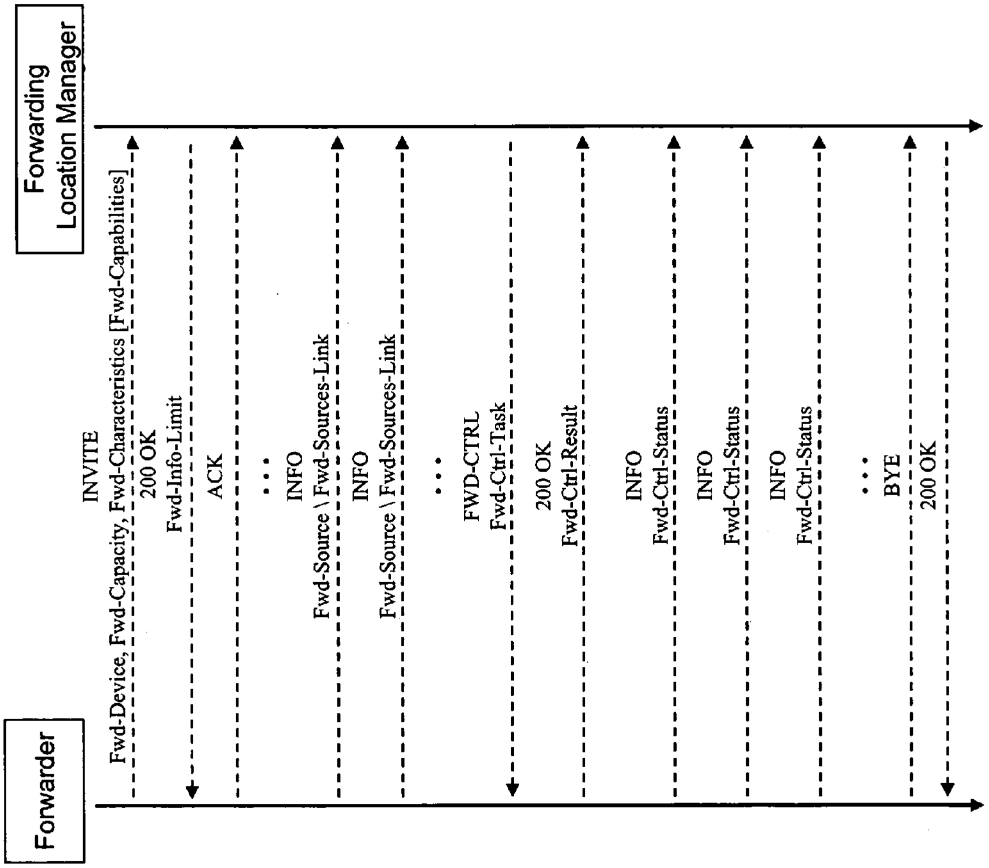
FIG. 9 is a block diagram illustrating an exemplary SIP interaction flow, according to a preferred embodiment of the present invention.

An exemplary flow of SIP messages, as described in the previous paragraphs, is illustrated in FIG. 9.

Forwarding Media Session

The forwarding media session, which is initiated by the media target, usually the forwarding receiver, towards the media provider, which is usually the forwarding device.

The forwarding media session is started in a session establishment interaction, composed from a modified INVITE transaction, along with the accompanying ACK request, and an ending session termination interaction. The termination interaction is based on the standard BYE transaction. Both interactions are conceptually initiated from the media target towards the media provider. Other then these establishment and termination interactions, no other interactions are expected unless some problem occurs.

If some problem occurs in the forwarding device, the forwarding device notifies the relevant forwarding receiver. The notification is carried out by sending an error\status notification, encapsulated either in a modified INFO transaction or in a modified BYE transaction.

If some problem has occurred in the forwarding receiver, acting as a media target in the session, the forwarding media session, along with its related media transmission session, may be re-routed to another media target, thus providing improved availability and reliability.

This task of re-routing is done using the update forwarding interaction, which is either mapped to the SIP UPDATE method, defined as an extension to the standard SIP in RFC3311, or to the standard re-inviting mechanism, built out of additional INVITE and ACK transactions, and sent on the same SIP dialog.

Figure 10:
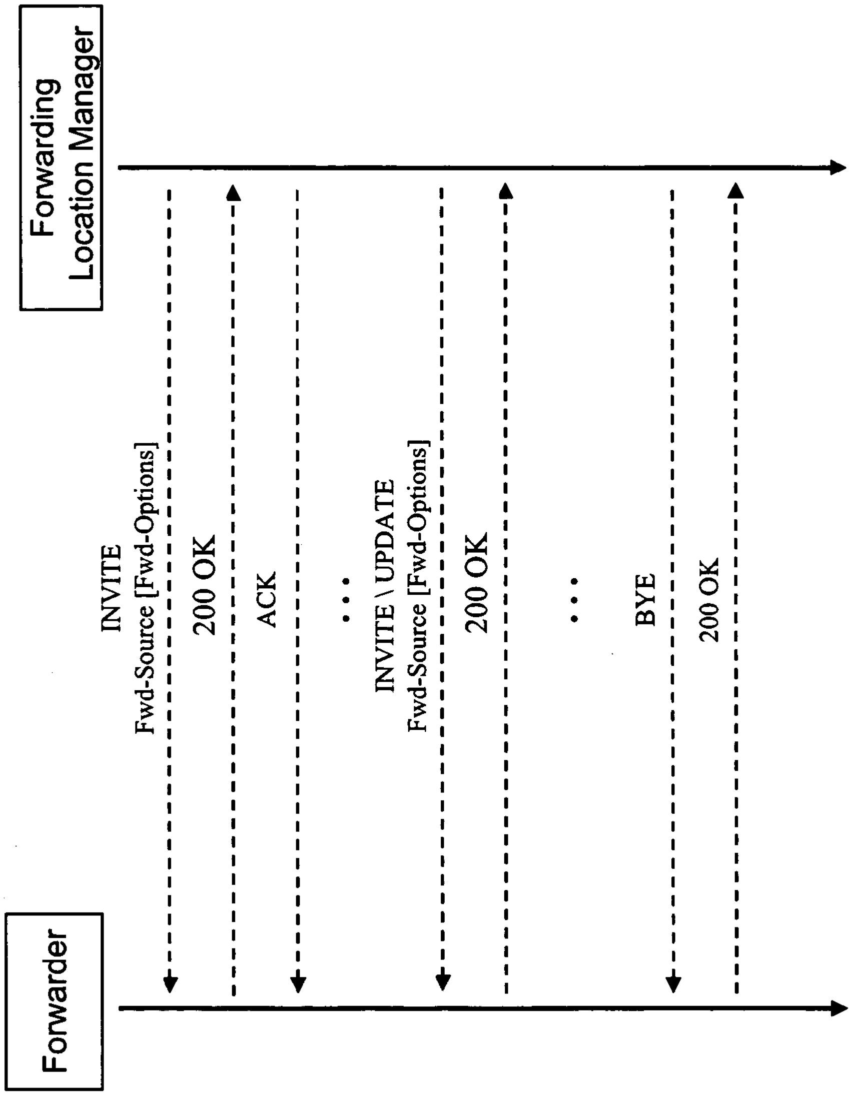
FIG. 10 is a second block diagram illustrating an exemplary SIP interaction flow, according to a preferred embodiment of the present invention.

FIG. 10 illustrates an exemplary SIP flow, in accordance with a preferred embodiment of the present invention.

Additional Header Elements—Elementary Flow

There are several header elements, which are added to the standard SIP header elements, as part of the SIP forwarding extension. This section lists the elements belonging to the elementary flow.

Information about these header elements in relation to the methods and proxy processing is summarized in the following table, which extends tables 2 and 3 of the SIP standard (RFC326 1). The methods in the table include two references to the SIP INVITE, one used for the establishment of forwarding control sessions, marked as INVITE (Ctrl), and one used for the establishment of forwarding media sessions, marked as INVITE (Media).

TABLE 10

| Header Element | Where | Proxy | INVITE (Ctrl) | INVITE (Media) | BYE | INFO | UP-DATE |
|---|---|---|---|---|---|---|---|
| Fwd-Capabilities | R | | o | — | — | — | — |
| Fwd-Capacity | R | | m | — | — | — | — |

TABLE 10-continued

| Header Element | Where | Proxy | INVITE (Ctrl) | INVITE (Media) | BYE | INFO | UP-DATE |
|---|---|---|---|---|---|---|---|
| Fwd-Characteristics | R | | m | — | — | — | — |
| Fwd-Context | R | | — | o | — | — | o |
| Fwd-Device | R | | m | — | — | — | — |
| Fwd-Info-Limit | R | | o | — | — | — | — |
| Fwd-Info-Limit | r | | m* | — | — | — | — |
| Fwd-Options | R | | — | o | — | — | o |
| Fwd-Source | R | | — | m | — | o | o |
| Fwd-Sources-Link | R | | — | — | — | c | — |
| Fwd-Status | R | | — | — | o | o | — |

Fwd-Capabilities

The Fwd-Capabilities field indicates the advanced forwarding related features, which are supported by the forwarding device. The field is used as part of the logical registration of the forwarding device within the recording system, usually towards the forwarding location manager. The field is used as a part of the INVITE request, which is part of the forwarding control session establishment.

Fwd-Capacity

The Fwd-Capacity field indicates the capacity of the forwarding device and is used as part of the logical registration of the forwarding device within the recording system. The registration is usually sent towards the forwarding device manager, as part of the INVITE request, which is part of the forwarding control session establishment.

Capacity of a forwarding device can be measured in two ways. The first one is the maximum number of media transmission sessions, opened concurrently between the device, acting as a media provider, and a designated media target, usually a forwarding receiver. The second way is the maximum number of media transmission rules, which are more restrictive in nature then the media transmission sessions just described above.

One difference between the transmission sessions and the transmission rules is that the rules, unlike the sessions, are directly bound to media sources. A forwarding device, whose capacity is measured in rules, can forward only up to a certain number of media sources, where each media source can be forwarded in a single rule. A forwarding device, whose capacity is measured in sessions, on the other hand, can forward the same media source to a combination of targets, as part of any combination of sessions.

Fwd-Characteristics

The Fwd-Characteristics field indicates the characteristics of the forwarding device and is used as part of the logical registration of the forwarding device within the recording system. Usually the logical registration is sent towards the forwarding manager, as part of the INVITE request, which is part of the forwarding control session establishment.

These characteristics basically define the nature of the forwarding device, thus enabling the forwarding manager to understand how to treat the device, especially in regards with the media sources notification, passed from the device to the forwarding location manager.

Exemplary types of forwarding devices include the following:—Deterministic Forwarding Device—A forwarding device, which is fully aware of the media sources available to the forwarding device. This type of device is usually an integral part of the IP telephony system (For example, a forwarding enabled IP phone).

Non-Deterministic Forwarding Device—A forwarding device, which has no awareness of the media sources accessible by the device. This type of device, is usually implemented as an extension of the forwarding-based recording system. For example, the device may be a recording agent.

A Forwarding Device having learning capabilities—A forwarding device, which is completely unaware of the media sources accessible by the device, but has the capability to check and verify if the needed media may be provided by it-define it. For example, the device may employ internal communication channels to the surrounding IP telephony system, for finding out if the media source is available to the device.

Fwd-Device

The Fwd-Device field lists the forwarding device used, the version of the device, etc.

Fwd-Info-Limit

The Fwd-Info-Limit field indicates the size limitation of the information in a single media source notification message.

Fwd-Options

The Fwd-Options field parameters holds characteristics of the media such as a parameter indicating a security level for the session, etc.

Fwd-Source

The Fwd-Source field identifies the media source where from the media is forwarded.

Fwd-Source-Link

The Fwd-Source-Link field serves to indicate a conference established with two media sources. The field is relevant only to non-deterministic forwarding devices.

Fwd-Status

The Fwd-Status field serves to indicate a status or a code identifying a certain error which occurs during the interaction.

Optionally, there may be defined and used supplementary or alternative header elements may be used.

Monitoring Session Aliveness

One built-in mechanism in SIP, usable for monitoring aliveness of active sessions is the Session Timers extension, which is defined in RFC4028 (see external document table hereinabove).

The Session Timers extension provides a mechanism for monitoring the aliveness of SIP sessions, covering not only the session monitoring in the involved user-agents, but also the sessions monitoring on state-full proxies, which the SIP session is routed through.

The extension is used to establish a session interval between two user-agents, as well as to define which party is the Refresh agent in the SIP session, as part of the establishment of the session.

After the establishment of the session, it is the responsibility of the Refresh Agent to periodically initiate a session refresh interaction. The interaction is implemented using an SIP re-INVITE transaction or an SIP UPDATE transaction, prior to the expiration of the session's interval. As a result, the expiration time of the session is delayed. The refresh request is routed via the same proxies involved in the session establishment, thus extending the session expiration not only in the involved user-agents but also in the chain of involved proxies.

The negotiation to establish the session's interval is based on defining a time-frame for that interval, composed from a minimum value and a proposed value for the interval, which acts as an upper-bound.

The time-frame is defined by the initiating user-agent in the INVITE request. The time-frame is passed along the session's route, through the chain of proxies that can narrow the time frame by modifying these values, thus adapt the time frame according to their needs.

There are two main advantages of using the 'Session Timers' extension for monitoring SIP sessions aliveness.

The first one is that the aliveness of the session is monitored not only by the involved user-agents, but also by the relevant SIP proxies.

The second one is that the extension also defines a procedure to handle session aliveness monitoring in cases where not all the involved parties support session aliveness monitoring.

A possible drawback in using the extension is that the recommended session interval is about 30 minutes, which may be too long.

Optionally, monitoring aliveness of active sessions may be implemented using status query interactions, as described in further detail hereinabove.

However, unlike Session Timers, status query interactions are not enforced in an infrastructure layer.

Security

A preferred embodiment of the present invention may implement built-in Security Mechanisms of the SIP Protocol.

The mechanisms may include, but are not limited to: SSL/TLS (defined in RFC2246), S/MIME (defined in EFC2633, version 3), User-to-User and User-to-Proxy authentication services (Such as the http digest authentication described in RFC2616 or X.509 certification, as known in the art).

When discussing the matter of security requirements, which may be needed for the various entities, two distinct subjects come to mind. The first is the security requirements of the forwarder as an SIP user agent, interacting with the surrounding SIP infrastructure. The second one is the requirements, related to security issues, of the forwarder as a logical entity in a forwarding-based recording system Preferably, there may also be implemented content authentication.

One currently standard way to achieve content authentication, as well as content integrity verification of messages is to sign them digitally.

The process of digital signature may include: calculating a hash value representing the content, and then encrypting the hash value. The resulting encrypted hash value is then attached to the message.

The recipient of the message may authenticate the message and verify that the message integrity is intact. Optionally, the recipient simply recalculates the encrypted hash value, based on the message content, and compares the calculated value with the received value.

Typically, the encryption method used is asymmetric. A private key is used for generating the encrypted hash value, known as the signature, while a public key is used for the verification of the signature. Thus, the recipient of a message has to have the public key.

Optionally, the receiving party is provided with the public key in advance.

However, providing the public key in advance is feasible only in completely static systems where the parties are known in advance.

Preferably, the public keys are dispatched dynamically between the parties.

However, if the public key is simply passed in the message, any intermediate receiver of the message can modify its content. An intermediate receiver may also change the attached public key from the original sender's key to some other public key, and generate a new signature, using the relevant private key.

Preferably, in order to avoid such a change, the public key may be encapsulated in an X.509 certificate. The X.509 certificate provides together with the key, information regarding the identity of the producer of the key. The X.509 certificate also provides information regarding the identity of the party, who issued the certificate to this key producer.

The X.509 certificate may have two basic formats: a full format, containing both a private and a public key, and a public format that contains only the public key.

Preferably, there may be used a single X.509 root certificate. For example, each forwarding entity may implement a full format entity certificate, including the root certificate in its public format. Whenever a forwarding session is established between two forwarding entities, they exchange the entities certificates between themselves.

With SIP, the certificates may be transferred back and forth in the session initiation interaction, and the signed messages may be sent from one entity to the other.

Handling Device Errors

Preferably, error and status indications are encapsulated in two types of transactions.

Optionally, there may be used an error\status notification interaction, as discussed in further detail hereinabove.

The error\status notification interaction is based on a modified SIP INFO transaction. This type of transaction is related to notifications which have no terminal implication regarding the specific forwarding session. Notifications which have no terminal implications have to do with relatively minor errors that do not involve an interruption of the session, such as INFO level status indications and WARNING level errors.

Preferably, the error information is encapsulated in a modified BYE transaction, which passes the error indication along with terminating the forwarding session at the same time.

Preferably, there is further implemented prioritization in case of predefined critical level errors. A critical level error is an error related to the forwarding device as a whole.

A forwarder may be involved in both a forwarding control session, established towards the forwarding manager, and several forwarding media sessions, established by forwarding receivers towards the forwarder. The forwarder may prioritize the termination of the forwarding control session over the termination of the various other forwarding media sessions handled and established towards the forwarder. Thus the forwarding control session is first to be terminated, once a critical level error occurs on the forwarder.

High Availability and Resiliency

A system according to a preferred embodiment may implement one of current methods of availability and resiliency.

Preferably, there is implemented a resiliency method based on SIP Mobility and Session Hijacking capabilities.

The SIP mobility feature is the ability to register several physical contacts as a single logical contact. That is to say several IP addresses, located on several hosting machines, may be registered under the same URI (uniform resource identifier). Consequently, there may be implemented a hot (or warm) standby resiliency method, by registering two paired devices under the same URI. That is to say, once one of the two devices fails, the other devices keep communicating the paired device since it has the same URI. Thus the paired device seamlessly replaces the failed device.

Optionally, there may be implemented a warm, cold, or no standby resiliency method based on a forwarding context. The forwarding context is a flag associated with a forwarding session, and attached to a media forwarding session when the session in established. The context may be used by a forwarding receiver to refer to the session even if the forwarding receiver is not the initiator of the session. Consequently, a Hijacking scheme may be implemented in an application layer (rather than the SIP Hijacking scheme described hereinabove, which is implemented in the SIP layer).

It is expected that during the life of this patent many relevant devices and systems will be developed and the scope of the terms herein, particularly of the terms “packet”, “media”, “stream”, “protocol”, “VoIP”, “IP”, “network”, “capture device”, and “forwarding device” is intended to include all such new technologies a priori.

Additional objects, advantages, and novel features of the present invention will become apparent to one ordinarily skilled in the art upon examination of the following examples, which are not intended to be limiting. Additionally, each of the various embodiments and aspects of the present invention as delineated hereinabove and as claimed in the claims section below finds experimental support in the following examples.

It is appreciated that certain features of the invention, which are, for clarity, described in the context of separate embodiments, may also be provided in combination in a single embodiment. Conversely, various features of the invention, which are, for brevity, described in the context of a single embodiment, may also be provided separately or in any suitable sub-combination.

Although the invention has been described in conjunction with specific embodiments thereof, it is evident that many alternatives, modifications and variations will be apparent to those skilled in the art. Accordingly, it is intended to embrace all such alternatives, modifications and variations that fall within the spirit and broad scope of the appended claims.

All publications, patents and patent applications mentioned in this specification are herein incorporated in their entirety by reference into the specification, to the same extent as if each individual publication, patent or patent application was specifically and individually indicated to be incorporated herein by reference. In addition, citation or identification of any reference in this application shall not be construed as an admission that such reference is available as prior art to the present invention.

What is claimed is:

1. System for forwarding and recording packet-based media in a network, the system comprising:

a recording device to record Voice over Internet Protocol (VoIP) packets;

at least one forwarder, configured to select, according to a predefined policy, at least one packet of media transmitted through at least one media source accessible to the forwarder, and to forward the selected packet of media to the recording device; and a forwarding manager separate from and communicating with the forwarder, using a predefined protocol, said communicating comprising receiving information relating to the forwarder and the at least one media source accessible to the forwarder and receiving a request for recording VoIP from an identified media source, and configured to provide a list containing at least one forwarder to a recording management unit, wherein said listed at least one forwarder is usable for forwarding the at least one packet of media from the identified media source according to said information, wherein the recording management unit is configured to select from said list a particular forwarder to forward VoIP packets from the identified media source to the recording device.

2. The system of claim 1, wherein the recording device is configured to communicate with the forwarder for receiving said selected and forwarded packet of media.

3. The system of claim 1, wherein said predefined protocol complies with Session Initiation Protocol (SIP).

4. The system of claim 1, wherein said forwarder is further configured to select the packets of media amongst data packets transmitted through the media source according to a predefined policy.

5. The system of claim 1, wherein said forwarding manager is further configured to initiate and terminate said forwarding of said at least one packet of media from said identified media source by said forwarder.

6. The system of claim 1, wherein said forwarding manager is further configured to initiate and terminate said forwarding of said at least one packet of media from said identified media source by said forwarder, utilizing a proxy service implemented on said forwarding manager.

7. The system of claim 1, wherein said forwarding manager is further configured to initiate and terminate said forwarding of said at least one packet of media from said identified media source by said forwarder, utilizing a Computer Telephony Integration (CTI) link.

8. The system of claim 1, wherein said recording device is further configured to initiate and terminate said forwarding of said at least one packet of media from said identified media source by said forwarder.

9. The system of claim 1, wherein said recording device is further configured to initiate and terminate said forwarding of said at least one packet of media from said identified media source by said forwarder, utilizing a Computer Telephony Integration (CTI) link.

10. The system of claim 1, wherein said forwarder is implemented on a recording gateway associated with said media source.

11. The system of claim 1, wherein said forwarder is implemented on said media source.

12. The system of claim 1, wherein said forwarder is implemented as an agent on a soft phone.

13. The system of claim 1, wherein said forwarder is further configured to select said packets of media in a passive manner.

14. The system of claim 1, wherein said forwarder is further configured to select said packets of media from a Network Interface Card (NIC).

15. The system of claim 1, wherein said forwarder is further configured to forward said selected packets of media to said recording device, according to a dynamic set of dispatching rules.

16. The system of claim 1, wherein said forwarding manager is further configured to update a persistent repository with information relating to the at least one forwarder and the at least one media source accessible to the forwarder, and to use said persistent repository for session recovery purposes.

17. Method for forwarding and recording packet-based media in a network, comprising:

updating, by a forwarding manager, a list according to information received using a predefined protocol and relating to at least one forwarder among a plurality of forwarders and at least one media source accessible to said forwarder, the forwarder separate from and communicating with the forwarding manager;

receiving, by said forwarding manager, a request for recording VoIP from an identified media source, using said predefined protocol;

providing by said forwarding manager to a recording management unit, a list comprising at least one forwarder usable for selecting, according to a predefined policy, at least one packet of media transmitted through said identified media source according to said information; and selecting, by said recording management unit, at least one forwarder from said list to forward VoIP packets from said identified media source to said recording device.

18. The method of claim 17, wherein said predefined protocol complies with Session Initiation Protocol (SIP).

19. The method of claim 17, further comprising receiving a request for recording, the request identifying one of said forwarders usable for forwarding at least one packet of media from said identified media source, and instructing the recording device to initiate forwarding of said at least one media packet from said media source by said identified forwarder, using said predefined protocol.

20. The method of claim 17, further comprising receiving a request identifying one of said forwarders usable for forwarding at least one packet of media from said identified media source, and initiating forwarding of said at least one media packet from said media source by said identified forwarder, using said predefined protocol.

21. The method of claim 17, wherein said predefined protocol includes a registration request interaction.

22. The method of claim 21, wherein said registration request interaction is implemented using SIP INVITE and ACK transactions.

23. The method of claim 17, wherein said predefined protocol includes a media source update interaction.

24. The method of claim 23, wherein said media source update interaction is implemented as an SIP INFO transaction.

25. The method of claim 17, wherein said predefined protocol includes an unregistration command interaction.

26. The method of claim 25, wherein said unregistration command interaction is implemented as an SIP BYE transaction.

27. The method of claim 17, wherein said predefined protocol includes a Start Forwarding Command interaction.

28. The method of claim 27, wherein said Start Forwarding Command interaction is implemented using SIP INVITE and ACK transactions.

29. The method of claim 17, wherein said predefined protocol includes an Update Forwarding Command interaction.

30. The method of claim 29, wherein said Update Forwarding Command interaction is implemented using SIP INVITE and ACK transactions.

31. The method of claim 29, wherein said Update Forwarding Command interaction is implemented using SIP UPDATE transaction.

32. The method of claim 17, wherein said predefined protocol includes a Stop Forwarding Command interaction.

33. The method of claim 32, wherein said Stop Forwarding Command interaction is implemented as an SIP BYE transaction.

34. The method of claim 17, wherein said predefined protocol includes a Status Notification interaction.

35. The method of claim 34, wherein said Status Notification interaction is implemented as an SIP INFO transaction.

36. The method of claim 17, wherein said predefined protocol includes a re-registration interaction, based on pre-obtained information, said re-registration interaction being used for session recovery purposes.

37. The method of claim 36, wherein said re-registration interaction is implemented using an INVITE transaction.

* * * * *